US008232876B2

(12) United States Patent
Derrick et al.

(10) Patent No.: US 8,232,876 B2
(45) Date of Patent: Jul. 31, 2012

(54) SYSTEM AND METHOD FOR MONITORING INDIVIDUALS USING A BEACON AND INTELLIGENT REMOTE TRACKING DEVICE

(75) Inventors: David Derrick, Sandy, UT (US); Bruce Derrick, Sandy, UT (US); Scott Horrocks, Salt Lake City, UT (US)

(73) Assignee: SecureAlert, Inc., Sandy, UT (US)

( * ) Notice: Subject to any disclaimer, the term of this patent is extended or adjusted under 35 U.S.C. 154(b) by 661 days.

(21) Appl. No.: 12/399,151

(22) Filed: Mar. 6, 2009

(65) Prior Publication Data

US 2009/0224909 A1 Sep. 10, 2009

Related U.S. Application Data

(60) Provisional application No. 61/034,720, filed on Mar. 7, 2008.

(51) Int. Cl.
*G08B 1/08* (2006.01)

(52) U.S. Cl. ............ 340/539.13; 340/539.1; 340/539.15

(58) Field of Classification Search ............... 340/539.1, 340/539.13
See application file for complete search history.

(56) References Cited

U.S. PATENT DOCUMENTS

| | | | |
|---|---|---|---|
| 2,986,543 A | 5/1961 | Daniel | |
| 3,210,747 A | 10/1965 | Clynes | |
| 3,440,633 A | 4/1969 | Vinding | |
| 3,462,692 A | 8/1969 | Bartlett | |
| 3,478,344 A | 11/1969 | Schwitzgebel | |
| 3,568,161 A | 3/1971 | Knickel | |
| 3,572,316 A | 3/1971 | Vogelman | |
| 3,609,741 A | 9/1971 | Miller | |

(Continued)

FOREIGN PATENT DOCUMENTS

DE 4413974 11/1995

(Continued)

OTHER PUBLICATIONS

International Search Report and Written Opinion for PCR/US2006/30432 dated Aug. 8, 2007.

(Continued)

*Primary Examiner* — Travis Hunnings
(74) *Attorney, Agent, or Firm* — Workman Nydegger

(57) ABSTRACT

A system for monitoring an individual is described where the system includes a fixed beacon at a known location, the fixed beacon periodically emitting a signal indicating the identity of the beacon, a remote tracking device securely affixed to the individual, the remote tracking device including a short range transceiver, a long range transceiver, and a rule set establishing operating parameters for the remote tracking device, wherein the short range transceiver is operable to receive the signal from the beacon and to use the signal to determine compliance with one or more rules in the rule set, and a monitoring center monitoring the status of the remote tracking device using data sent by the remote tracking device using the long range transceiver. The beacon includes a transmitter for transmitting a short range signal, a movement detector operable to indicate when the beacon has been moved, an internal power supply for the beacon, and a processor connected to the transmitter and movement detector, the processor operable to maintain a log of the movement of the beacon and to cause the transmitter to periodically transmit the signal, wherein the signal includes a identification number for the beacon, a status for the internal power supply; and information related to the movement log.

21 Claims, 7 Drawing Sheets

U.S. PATENT DOCUMENTS

| | | |
|---|---|---|
| 3,639,907 A | 2/1972 | Greatbatch |
| 3,656,456 A | 4/1972 | Stigmark |
| 3,665,448 A | 5/1972 | McGlinchey |
| 3,743,865 A | 7/1973 | Reichmann |
| 3,758,855 A | 9/1973 | Meyer |
| 3,764,819 A | 10/1973 | Muller |
| 3,876,890 A | 4/1975 | Brown |
| 3,882,277 A | 5/1975 | DePedro |
| 3,898,472 A | 8/1975 | Long |
| 3,898,984 A | 8/1975 | Mandel |
| 3,914,692 A | 10/1975 | Seaborn |
| 3,925,763 A | 12/1975 | Wadhwani |
| 3,930,249 A | 12/1975 | Steck |
| 3,972,320 A | 8/1976 | Kalman |
| 3,973,208 A | 8/1976 | Diamond |
| 3,983,483 A | 9/1976 | Pando |
| 4,095,214 A | 6/1978 | Minasy |
| 4,110,741 A | 8/1978 | Hubert |
| 4,157,540 A | 6/1979 | Oros |
| 4,234,840 A | 11/1980 | Konrad |
| 4,237,344 A | 12/1980 | Moore |
| 4,258,709 A | 3/1981 | Flack |
| 4,259,665 A | 3/1981 | Manning |
| 4,275,385 A | 6/1981 | White |
| 4,285,146 A | 8/1981 | Charles |
| 4,293,852 A | 10/1981 | Rogers |
| 4,295,132 A | 10/1981 | Burney |
| 4,309,697 A | 1/1982 | Weaver |
| 4,316,134 A | 2/1982 | Balan |
| 4,319,241 A | 3/1982 | Mount |
| 4,331,161 A | 5/1982 | Patel |
| 4,342,986 A | 8/1982 | Buskirk |
| 4,359,733 A | 11/1982 | O'Neill |
| 4,445,118 A | 4/1984 | Taylor |
| 4,446,454 A | 5/1984 | Pyle |
| 4,523,184 A | 6/1985 | Abel |
| 4,536,755 A | 8/1985 | Holzgang |
| 4,549,169 A | 10/1985 | Moura et al. |
| 4,558,309 A | 12/1985 | Antonevich |
| 4,559,526 A | 12/1985 | Tani |
| 4,578,539 A | 3/1986 | Townsing |
| 4,591,661 A | 5/1986 | Benedetto |
| 4,596,988 A | 6/1986 | Wanka |
| 4,598,272 A | 7/1986 | Cox |
| 4,598,275 A | 7/1986 | Ross et al. |
| 4,622,544 A | 11/1986 | Bially |
| 4,630,035 A | 12/1986 | Stahl |
| 4,651,157 A | 3/1987 | Gray |
| 4,665,370 A | 5/1987 | Holland |
| 4,665,385 A | 5/1987 | Henderson |
| 4,665,387 A | 5/1987 | Cooper |
| 4,667,203 A | 5/1987 | Counselman |
| 4,673,936 A | 6/1987 | Kotoh |
| 4,675,656 A | 6/1987 | Narcisse |
| 4,682,155 A | 7/1987 | Shirley |
| 4,701,760 A | 10/1987 | Raoux |
| 4,728,959 A | 3/1988 | Maloney |
| 4,731,613 A | 3/1988 | Endo |
| 4,736,196 A | 4/1988 | McMahon et al. |
| 4,737,976 A | 4/1988 | Borth |
| 4,740,792 A | 4/1988 | Sagey |
| 4,741,245 A | 5/1988 | Malone |
| 4,742,336 A | 5/1988 | Hall |
| 4,742,357 A | 5/1988 | Rackley |
| 4,747,120 A | 5/1988 | Foley |
| 4,750,197 A | 6/1988 | Denekamp |
| 4,751,512 A | 6/1988 | Longaker |
| 4,754,283 A | 6/1988 | Fowler |
| 4,754,465 A | 6/1988 | Trimble |
| 4,764,757 A | 8/1988 | DeMarco |
| 4,777,477 A | 10/1988 | Watson |
| 4,791,572 A | 12/1988 | Green |
| 4,809,005 A | 2/1989 | Counselman |
| 4,812,823 A | 3/1989 | Dickerson |
| 4,812,991 A | 3/1989 | Hatch |
| 4,819,053 A | 4/1989 | Halavais |
| 4,819,162 A | 4/1989 | Webb |
| 4,819,860 A | 4/1989 | Hargrove |
| 4,820,966 A | 4/1989 | Fridman |
| 4,825,457 A | 4/1989 | Lebowitz |
| 4,833,477 A | 5/1989 | Tendler |
| 4,837,568 A | 6/1989 | Snaper |
| 4,843,377 A | 6/1989 | Fuller |
| 4,864,277 A | 9/1989 | Goodman |
| 4,885,571 A | 12/1989 | Pauley |
| 4,888,716 A | 12/1989 | Ueno |
| 4,891,650 A | 1/1990 | Sheffer |
| 4,891,761 A | 1/1990 | Gray |
| 4,894,662 A | 1/1990 | Counselman |
| 4,897,642 A | 1/1990 | Dilullo |
| 4,903,212 A | 2/1990 | Yokouchi |
| 4,907,290 A | 3/1990 | Crompton |
| 4,908,629 A | 3/1990 | Apsell et al. |
| 4,912,756 A | 3/1990 | Hop |
| 4,916,435 A | 4/1990 | Fuller |
| 4,918,425 A | 4/1990 | Greenberg |
| 4,918,432 A | 4/1990 | Pauley et al. |
| 4,924,699 A | 5/1990 | Kuroda |
| 4,928,107 A | 5/1990 | Kuroda |
| 4,952,913 A | 8/1990 | Pauley |
| 4,952,928 A | 8/1990 | Carroll |
| 4,953,198 A | 8/1990 | Daly |
| 4,956,861 A | 9/1990 | Kondo |
| 4,961,212 A | 10/1990 | Marui |
| 4,965,548 A | 10/1990 | Fayfield |
| 4,980,671 A | 12/1990 | McCurdy |
| 4,983,980 A | 1/1991 | Ando |
| 4,993,061 A | 2/1991 | Hsieh |
| 4,996,161 A | 2/1991 | Conners |
| 4,999,613 A | 3/1991 | Williamson |
| 5,003,317 A | 3/1991 | Gray |
| 5,003,595 A | 3/1991 | Collins |
| 5,008,930 A | 4/1991 | Gawrys |
| 5,014,040 A | 5/1991 | Weaver |
| 5,014,066 A | 5/1991 | Counselman |
| 5,014,206 A | 5/1991 | Scribner |
| 5,019,802 A | 5/1991 | Brittain |
| 5,019,828 A | 5/1991 | Schoolman |
| 5,021,794 A | 6/1991 | Lawrence |
| 5,023,904 A | 6/1991 | Kaplan |
| 5,025,253 A | 6/1991 | Dilullo |
| 5,025,261 A | 6/1991 | Ohta |
| 5,032,823 A | 7/1991 | Bower |
| 5,032,845 A | 7/1991 | Velasco |
| 5,043,736 A | 8/1991 | Darnell |
| 5,055,851 A | 10/1991 | Sheffer |
| 5,075,670 A | 12/1991 | Bower |
| 5,077,788 A | 12/1991 | Cook |
| 5,081,667 A | 1/1992 | Drori |
| 5,115,223 A | 5/1992 | Moody |
| 5,117,222 A | 5/1992 | McCurdy |
| 5,119,102 A | 6/1992 | Barnard |
| 5,131,020 A | 7/1992 | Liebesny |
| 5,146,207 A | 9/1992 | Henry |
| 5,146,231 A | 9/1992 | Ghaem |
| 5,148,471 A | 9/1992 | Metroka |
| 5,148,473 A | 9/1992 | Freeland |
| 5,155,689 A | 10/1992 | Wortham |
| 5,170,426 A | 12/1992 | D'Alessio |
| 5,179,519 A | 1/1993 | Adachi |
| 5,182,543 A | 1/1993 | Siegel |
| 5,193,215 A | 3/1993 | Olmer |
| 5,198,831 A | 3/1993 | Burrell |
| 5,203,009 A | 4/1993 | Bogusz |
| 5,204,670 A | 4/1993 | Stinton |
| 5,206,897 A | 4/1993 | Goudreau |
| 5,218,344 A | 6/1993 | Ricketts |
| 5,218,367 A | 6/1993 | Sheffer |
| 5,220,509 A | 6/1993 | Takemura |
| 5,223,844 A | 6/1993 | Mansell |
| 5,225,842 A | 7/1993 | Brown |
| 5,235,320 A | 8/1993 | Romano |
| 5,235,633 A | 8/1993 | Dennison |
| 5,243,652 A | 9/1993 | Teare |
| 5,247,564 A | 9/1993 | Zicker |
| 5,255,183 A | 10/1993 | Katz |
| 5,255,306 A | 10/1993 | Melton et al. |

| Patent | Date | Name | Patent | Date | Name |
|---|---|---|---|---|---|
| 5,257,195 A | 10/1993 | Hirata | 5,525,969 A | 6/1996 | LaDue |
| 5,266,944 A | 11/1993 | Carroll et al. | 5,528,248 A | 6/1996 | Steiner |
| 5,266,958 A | 11/1993 | Durboraw | 5,532,690 A | 7/1996 | Hertel |
| 5,268,845 A | 12/1993 | Startup | 5,537,102 A | 7/1996 | Pinnow |
| 5,274,695 A | 12/1993 | Green | 5,541,845 A | 7/1996 | Klein |
| 5,278,539 A | 1/1994 | Lauterbach et al. | 5,542,100 A | 7/1996 | Hatakeyama |
| 5,297,186 A | 3/1994 | Dong | 5,543,780 A | 8/1996 | Mcauley |
| 5,298,884 A | 3/1994 | Gilmore | 5,544,661 A | 8/1996 | Davis |
| 5,299,132 A | 3/1994 | Wortham | 5,546,445 A | 8/1996 | Dennison |
| 5,305,370 A | 4/1994 | Kearns | 5,550,551 A | 8/1996 | Alesio |
| 5,307,277 A | 4/1994 | Hirano | 5,552,772 A | 9/1996 | Janky |
| 5,311,197 A | 5/1994 | Sorden | 5,555,286 A | 9/1996 | Tendler |
| 5,311,374 A | 5/1994 | Oh | 5,557,254 A | 9/1996 | Johnson |
| 5,317,309 A | 5/1994 | Vercellotti | 5,559,491 A | 9/1996 | Stadler |
| 5,317,620 A | 5/1994 | Smith | 5,559,497 A | 9/1996 | Hong |
| 5,319,374 A | 6/1994 | Desai | 5,563,931 A | 10/1996 | Bishop |
| 5,319,698 A | 6/1994 | Glidewell | 5,568,119 A | 10/1996 | Schipper et al. |
| 5,334,974 A | 8/1994 | Simms | 5,572,204 A | 11/1996 | Timm |
| 5,334,986 A | 8/1994 | Fernhout | 5,572,217 A | 11/1996 | Flawn |
| 5,349,530 A | 9/1994 | Odagawa | 5,574,649 A | 11/1996 | Levy |
| 5,353,376 A | 10/1994 | Oh | 5,576,716 A | 11/1996 | Sadler |
| 5,355,140 A | 10/1994 | Slavin | 5,587,715 A | 12/1996 | Lewis |
| 5,357,560 A | 10/1994 | Nykerk | 5,588,038 A | 12/1996 | Snyder |
| 5,365,451 A | 11/1994 | Wang | 5,589,834 A | 12/1996 | Weinberg |
| 5,365,570 A | 11/1994 | Boubelik | 5,594,425 A | 1/1997 | Ladner |
| 5,367,524 A | 11/1994 | Rideout | 5,594,650 A | 1/1997 | Shah |
| 5,369,699 A | 11/1994 | Page | 5,596,262 A | 1/1997 | Boll |
| 5,374,933 A | 12/1994 | Kao | 5,596,313 A | 1/1997 | Berglund |
| 5,377,256 A | 12/1994 | Franklin | 5,598,151 A | 1/1997 | Torii |
| 5,379,224 A | 1/1995 | Brown | 5,600,230 A | 2/1997 | Dunstan |
| 5,388,147 A | 2/1995 | Grimes | 5,602,739 A | 2/1997 | Haagenstad |
| 5,389,934 A | 2/1995 | Kass | 5,612,675 A | 3/1997 | Jennings |
| 5,392,052 A | 2/1995 | Eberwine | 5,617,317 A | 4/1997 | Ignagni |
| 5,394,333 A | 2/1995 | Kao | 5,621,388 A | 4/1997 | Sherburne |
| 5,396,227 A | 3/1995 | Carroll | 5,625,668 A | 4/1997 | Loomis |
| 5,396,516 A | 3/1995 | Padovani | 5,627,520 A | 5/1997 | Grubbs |
| 5,396,540 A | 3/1995 | Gooch | 5,627,548 A | 5/1997 | Woo |
| 5,398,190 A | 3/1995 | Wortham | 5,629,693 A | 5/1997 | Janky |
| 5,402,466 A | 3/1995 | Delahanty | 5,630,206 A | 5/1997 | Urban |
| 5,416,468 A | 5/1995 | Baumann | 5,644,317 A | 7/1997 | Weston |
| 5,416,695 A | 5/1995 | Stutman | 5,646,593 A | 7/1997 | Hughes |
| 5,416,808 A | 5/1995 | Witsaman | 5,650,770 A | 7/1997 | Schlager |
| 5,418,537 A | 5/1995 | Bird | 5,652,570 A | 7/1997 | Lepkofker |
| 5,422,816 A | 6/1995 | Sprague | 5,673,035 A | 9/1997 | Huang |
| 5,426,425 A | 6/1995 | Conrad | 5,673,305 A | 9/1997 | Ross |
| 5,428,546 A | 6/1995 | Shah | 5,677,521 A | 10/1997 | Garrou |
| 5,430,656 A | 7/1995 | Dekel | 5,682,133 A | 10/1997 | Johnson |
| 5,437,278 A | 8/1995 | Wilk | 5,682,142 A | 10/1997 | Loosmore |
| 5,438,315 A | 8/1995 | Nix | 5,684,828 A | 11/1997 | Bolan et al. |
| 5,444,430 A | 8/1995 | Mcshane | 5,686,910 A | 11/1997 | Timm |
| 5,448,221 A | 9/1995 | Weller | 5,686,924 A | 11/1997 | Trimble |
| 5,451,948 A | 9/1995 | Jekel | 5,687,103 A | 11/1997 | Hagl et al. |
| 5,461,365 A | 10/1995 | Schlager | 5,687,215 A | 11/1997 | Timm |
| 5,461,390 A | 10/1995 | Hoshen | 5,694,452 A | 12/1997 | Bertolet |
| 5,465,388 A | 11/1995 | Zicker | 5,699,256 A | 12/1997 | Shibuya |
| 5,475,751 A | 12/1995 | McMonagle | 5,703,598 A | 12/1997 | Emmons |
| 5,479,149 A | 12/1995 | Pike | 5,705,980 A | 1/1998 | Shapiro |
| 5,479,479 A | 12/1995 | Braitberg | 5,712,619 A | 1/1998 | Simkin |
| 5,479,482 A | 12/1995 | Grimes | 5,715,277 A | 2/1998 | Goodson |
| 5,485,385 A | 1/1996 | Mitsugi | 5,721,678 A | 2/1998 | Widl |
| 5,490,200 A | 2/1996 | Snyder | 5,722,081 A | 2/1998 | Tamura |
| 5,493,692 A | 2/1996 | Theimer | 5,722,418 A | 3/1998 | Bro |
| 5,493,694 A | 2/1996 | Vicek | 5,724,316 A | 3/1998 | Brunts |
| 5,497,148 A | 3/1996 | Olivia | 5,726,893 A | 3/1998 | Schuchman |
| 5,497,149 A | 3/1996 | Fast | 5,727,057 A | 3/1998 | Emery |
| 5,504,482 A | 4/1996 | Schreder | 5,731,757 A | 3/1998 | Layson, Jr. |
| 5,510,797 A | 4/1996 | Abraham | 5,732,076 A | 3/1998 | Ketseoglou |
| 5,512,879 A | 4/1996 | Stokes | 5,736,962 A | 4/1998 | Tendler |
| 5,513,111 A | 4/1996 | Wortham | 5,740,049 A | 4/1998 | Kaise |
| 5,515,043 A | 5/1996 | Bernard | 5,740,532 A | 4/1998 | Fernandez |
| 5,515,062 A | 5/1996 | Maine et al. | 5,740,547 A | 4/1998 | Kull |
| 5,515,285 A | 5/1996 | Garrett | 5,742,233 A | 4/1998 | Hoffman et al. |
| 5,517,419 A | 5/1996 | Lanckton | 5,742,509 A | 4/1998 | Goldberg |
| 5,518,402 A | 5/1996 | Tommarello et al. | 5,742,666 A | 4/1998 | Alpert |
| 5,519,380 A | 5/1996 | Edwards | 5,742,686 A | 4/1998 | Finley |
| 5,519,403 A | 5/1996 | Bickley | 5,742,904 A | 4/1998 | Pinder |
| 5,519,621 A | 5/1996 | Wortham | 5,745,037 A | 4/1998 | Guthrie |
| 5,523,740 A | 6/1996 | Burgmann | 5,745,849 A | 4/1998 | Britton |
| 5,525,967 A | 6/1996 | Azizi | 5,745,868 A | 4/1998 | Geier |

| | | | | | | |
|---|---|---|---|---|---|---|
| 5,748,089 A | 5/1998 | Sizemore | | 5,948,043 A | 9/1999 | Mathis |
| 5,748,148 A | 5/1998 | Heiser | | 5,949,350 A | 9/1999 | Girard |
| 5,751,246 A | 5/1998 | Hertel | | 5,959,533 A | 9/1999 | Layson |
| 5,752,976 A | 5/1998 | Duffin et al. | | 5,963,130 A | 10/1999 | Schlager |
| 5,757,367 A | 5/1998 | Kapoor | | 5,966,079 A | 10/1999 | Tanguay |
| 5,760,692 A | 6/1998 | Block | | 5,969,600 A | 10/1999 | Tanguay |
| 5,767,788 A | 6/1998 | Ness | | 5,969,673 A | 10/1999 | Bickley |
| 5,771,002 A | 6/1998 | Creek | | 5,982,281 A | 11/1999 | Layson, Jr. |
| 5,774,825 A | 6/1998 | Reynolds | | 5,982,813 A | 11/1999 | Dutta |
| 5,777,580 A | 7/1998 | Janky | | 5,983,115 A | 11/1999 | Mizikovsky |
| 5,781,101 A | 7/1998 | Stephen | | 5,990,785 A | 11/1999 | Suda |
| 5,784,029 A | 7/1998 | Geier | | 5,990,793 A | 11/1999 | Bieback |
| 5,786,789 A | 7/1998 | Janky | | 5,991,637 A | 11/1999 | Mack |
| 5,790,022 A | 8/1998 | Delvecchio | | 5,995,847 A | 11/1999 | Gergen |
| 5,790,974 A | 8/1998 | Tognazzini | | 5,997,476 A | 12/1999 | Brown |
| 5,793,283 A | 8/1998 | Davis | | 5,999,124 A | 12/1999 | Sheynblat |
| 5,793,630 A | 8/1998 | Theimer | | 6,009,363 A | 12/1999 | Beckert |
| 5,794,174 A | 8/1998 | Janky | | 6,011,510 A | 1/2000 | Yee |
| 5,796,613 A | 8/1998 | Kato | | 6,014,080 A | 1/2000 | Layson, Jr. |
| 5,796,777 A | 8/1998 | Terlep | | 6,014,555 A | 1/2000 | Tendler |
| 5,797,091 A | 8/1998 | Clise | | 6,018,667 A | 1/2000 | Ghosh |
| 5,805,055 A | 9/1998 | Colizza | | 6,025,774 A | 2/2000 | Forbes |
| 5,809,426 A | 9/1998 | Radojevic | | 6,025,779 A | 2/2000 | Huang |
| 5,809,520 A | 9/1998 | Edwards | | 6,026,125 A | 2/2000 | Larrick |
| 5,811,886 A | 9/1998 | Majmudar | | 6,026,300 A | 2/2000 | Hicks |
| 5,815,118 A | 9/1998 | Schipper | | 6,026,345 A | 2/2000 | Shah |
| 5,818,333 A | 10/1998 | Yaffe | | 6,028,551 A | 2/2000 | Schoen |
| 5,819,864 A | 10/1998 | Koike | | 6,029,111 A | 2/2000 | Croyle |
| 5,825,283 A | 10/1998 | Camhi | | 6,031,454 A | 2/2000 | Lovejoy |
| 5,825,327 A | 10/1998 | Krasner | | 6,034,622 A | 3/2000 | Levine |
| 5,825,871 A | 10/1998 | Mark | | 6,035,201 A | 3/2000 | Whitehead |
| 5,828,292 A | 10/1998 | Kokhan | | 6,035,217 A | 3/2000 | Kravitz |
| 5,831,535 A | 11/1998 | Reisman et al. | | 6,044,257 A | 3/2000 | Boling |
| 5,835,017 A | 11/1998 | Ohkura | | 6,046,687 A | 4/2000 | Janky |
| 5,835,907 A | 11/1998 | Newman | | 6,047,196 A | 4/2000 | Makela |
| 5,842,146 A | 11/1998 | Shishido | | 6,054,928 A | 4/2000 | Lemelson |
| 5,844,894 A | 12/1998 | Bent | | 6,055,426 A | 4/2000 | Beasley |
| 5,847,679 A | 12/1998 | Yee | | 6,060,982 A | 5/2000 | Holtrop |
| 5,852,401 A | 12/1998 | Kita | | 6,061,018 A | 5/2000 | Sheynblat |
| 5,857,433 A | 1/1999 | Files | | 6,061,392 A | 5/2000 | Bremer |
| 5,867,103 A | 2/1999 | Taylor | | 6,061,561 A | 5/2000 | Alanara |
| 5,868,100 A | 2/1999 | Marsh | | 6,069,570 A | 5/2000 | Herring |
| 5,873,040 A | 2/1999 | Dunn | | 6,072,396 A | 6/2000 | Gaukel |
| 5,874,801 A | 2/1999 | Kobayashi | | 6,075,797 A | 6/2000 | Thomas |
| 5,874,889 A | 2/1999 | Higdon | | 6,075,821 A | 6/2000 | Kao |
| 5,875,402 A | 2/1999 | Yamawaki | | 6,084,510 A | 7/2000 | Lemelson |
| 5,877,724 A | 3/1999 | Davis | | 6,084,906 A | 7/2000 | Kao |
| 5,889,474 A | 3/1999 | LaDue | | 6,084,917 A | 7/2000 | Kao |
| 5,890,061 A | 3/1999 | Timm | | 6,088,387 A | 7/2000 | Gelblum |
| 5,890,092 A | 3/1999 | Kato | | 6,088,586 A | 7/2000 | Haverty |
| 5,892,447 A | 4/1999 | Wilkinson | | 6,091,325 A | 7/2000 | Zur |
| 5,892,454 A | 4/1999 | Schipper | | 6,091,786 A | 7/2000 | Chen |
| 5,892,825 A | 4/1999 | Mages | | 6,091,957 A | 7/2000 | Larkins |
| 5,894,498 A | 4/1999 | Kotzin | | 6,094,140 A | 7/2000 | Parente |
| 5,898,391 A | 4/1999 | Jefferies | | 6,097,337 A | 8/2000 | Bisio |
| 5,900,734 A | 5/1999 | Munson | | 6,100,806 A | 8/2000 | Gaukel |
| 5,905,461 A | 5/1999 | Neher | | 6,115,597 A | 9/2000 | Kroll |
| 5,906,655 A | 5/1999 | Fan | | 6,130,620 A | 10/2000 | Pinnow |
| 5,907,555 A | 5/1999 | Raith | | 6,160,481 A | 12/2000 | Taylor, Jr. |
| 5,912,623 A | 6/1999 | Pierson | | 6,181,253 B1 | 1/2001 | Eschenbach |
| 5,912,886 A | 6/1999 | Takahashi | | 6,198,394 B1 | 3/2001 | Jacobsen |
| 5,912,921 A | 6/1999 | Warren | | 6,198,914 B1 | 3/2001 | Saegusa |
| 5,914,675 A | 6/1999 | Tognazzini | | 6,218,945 B1 | 4/2001 | Taylor, Jr. |
| 5,917,405 A | 6/1999 | Joao | | 6,226,510 B1 | 5/2001 | Boling |
| 5,918,180 A | 6/1999 | Dimino | | 6,232,916 B1 | 5/2001 | Grillo |
| 5,918,183 A | 6/1999 | Janky | | 6,236,319 B1 | 5/2001 | Pitzer |
| 5,919,239 A | 7/1999 | Fraker | | 6,239,700 B1 | 5/2001 | Hoffman |
| 5,920,278 A | 7/1999 | Tyler | | 6,262,666 B1 | 7/2001 | Lodichand |
| 5,926,086 A | 7/1999 | Escareno | | 6,285,867 B1 | 9/2001 | Boling |
| 5,928,306 A | 7/1999 | France | | 6,313,733 B1 | 11/2001 | Kyte |
| 5,929,752 A | 7/1999 | Janky | | 6,356,841 B1 | 3/2002 | Hamrick |
| 5,929,753 A | 7/1999 | Montague | | 6,362,778 B2 * | 3/2002 | Neher ..................... 342/357.75 |
| 5,933,080 A | 8/1999 | Nojima | | 6,405,213 B1 | 6/2002 | Layson et al. |
| 5,936,529 A | 8/1999 | Reisman | | 6,437,696 B1 | 8/2002 | Lemelson et al. |
| 5,937,164 A | 8/1999 | Mages | | 6,518,889 B2 | 2/2003 | Schlager |
| 5,940,004 A | 8/1999 | Fulton | | 6,580,908 B1 | 6/2003 | Kroll |
| 5,940,439 A | 8/1999 | Kleider | | 6,636,732 B1 | 10/2003 | Boling |
| 5,945,906 A | 8/1999 | Onuma | | 6,639,516 B1 | 10/2003 | Copley |
| 5,945,944 A | 8/1999 | Krasner | | 6,639,519 B2 | 10/2003 | Drummond |

| | | |
|---|---|---|
| 6,646,617 B1 | 11/2003 | Gaukel |
| 6,671,351 B2 | 12/2003 | Menard |
| 6,674,368 B2 | 1/2004 | Hawkins et al. |
| 6,675,006 B1 | 1/2004 | Diaz |
| 6,687,497 B1 | 2/2004 | Parvulescu |
| 6,703,936 B2 | 3/2004 | Hill et al. |
| 6,762,684 B1 | 7/2004 | Camhi |
| 6,765,991 B1 | 7/2004 | Hanuschak |
| 6,766,159 B2 | 7/2004 | Lindholm |
| 6,774,797 B2 | 8/2004 | Freathy et al. |
| 6,782,208 B1 | 8/2004 | Lundholm |
| 6,847,892 B2 | 1/2005 | Zhou et al. |
| 6,859,650 B1 | 2/2005 | Ritter |
| 6,912,399 B2 | 6/2005 | Zirul |
| RE38,838 E | 10/2005 | Taylor, Jr. |
| 6,972,684 B2 | 12/2005 | Copley |
| 7,002,477 B1 | 2/2006 | Camhi |
| 7,015,817 B2* | 3/2006 | Copley et al. ............. 340/573.4 |
| 7,026,929 B1 | 4/2006 | Wallace |
| 7,038,590 B2 | 5/2006 | Hoffman |
| 7,042,338 B1 | 5/2006 | Weber |
| 7,061,399 B2* | 6/2006 | Leck ........................ 340/870.06 |
| 7,091,851 B2 | 8/2006 | Mason et al. |
| 7,092,695 B1 | 8/2006 | Boling |
| 7,106,191 B1 | 9/2006 | Liberati |
| 7,123,141 B2* | 10/2006 | Contestabile ............ 340/539.13 |
| 7,251,471 B2 | 7/2007 | Boling |
| 7,289,031 B1 | 10/2007 | Hock |
| RE39,909 E | 11/2007 | Taylor |
| 7,330,122 B2 | 2/2008 | Derrick |
| 7,375,629 B1* | 5/2008 | Moyer ..................... 340/539.13 |
| 7,446,656 B2* | 11/2008 | Blakeway ................ 340/539.21 |
| 7,545,318 B2 | 6/2009 | Derrick |
| 7,639,131 B2* | 12/2009 | Mock et al. .............. 340/539.3 |
| 7,705,728 B2* | 4/2010 | Mock et al. .............. 340/539.13 |
| 2002/0115436 A1 | 8/2002 | Howell et al. |
| 2003/0027547 A1 | 2/2003 | Wade |
| 2003/0107487 A1 | 6/2003 | Korman |
| 2003/0197612 A1 | 10/2003 | Tanaka |
| 2004/0066271 A1* | 4/2004 | Leck .............................. 340/3.1 |
| 2005/0040944 A1* | 2/2005 | Contestabile ............ 340/539.13 |
| 2005/0068169 A1* | 3/2005 | Copley et al. ............ 340/539.13 |
| 2006/0047543 A1 | 3/2006 | Moses |
| 2007/0023496 A1 | 2/2007 | Hall |
| 2007/0041427 A1 | 2/2007 | Small |
| 2007/0082677 A1 | 4/2007 | Donald Hart et al. |
| 2007/0258417 A1 | 11/2007 | Harvey et al. |
| 2008/0012760 A1 | 1/2008 | Derrick |
| 2008/0018458 A1 | 1/2008 | Derrick |
| 2008/0018459 A1 | 1/2008 | Derrick |
| 2008/0096521 A1 | 4/2008 | Boling |
| 2008/0143516 A1* | 6/2008 | Mock et al. .............. 340/539.14 |
| 2008/0174422 A1 | 7/2008 | Freathy |
| 2008/0218358 A1 | 9/2008 | Derrick |
| 2008/0316022 A1* | 12/2008 | Buck et al. ............... 340/539.13 |
| 2009/0224909 A1 | 9/2009 | Derrick |
| 2010/0066545 A1* | 3/2010 | Ghazarian ................ 340/573.4 |

FOREIGN PATENT DOCUMENTS

| | | |
|---|---|---|
| DE | 19625581 | 12/1997 |
| EP | 0017448 | 10/1980 |
| EP | 0242099 A2 | 10/1987 |
| EP | 0489915 A1 | 6/1992 |
| EP | 496538 A2 | 7/1992 |
| EP | 745867 A1 | 12/1996 |
| EP | 0780993 | 6/1997 |
| EP | 0809117 | 11/1997 |
| EP | 0889631 | 1/1999 |
| EP | 0946037 | 9/1999 |
| EP | 1363258 | 11/2003 |
| GB | 2141006 | 12/1984 |
| JP | 2007200 A | 1/1990 |
| JP | 6020191 A | 1/1994 |
| JP | 6036185 A | 2/1994 |
| WO | 87-004851 | 8/1987 |
| WO | 87-06713 | 11/1987 |
| WO | WO 93/00663 | 1/1993 |
| WO | 97-03511 | 1/1997 |
| WO | 00-77688 | 12/2000 |
| WO | WO 01/73466 | 10/2001 |

OTHER PUBLICATIONS

International Search Report for PCT/US2007/72736 dated Jan. 2, 2008.

John H Murphy et al., "Advanced Electronic Monitoring for Tracking Persons on Probation or Parole: Final Report", Grumman STC, Feb. 1996.

D. Evans, "Electronic Monitoring: Testimony to Ontario's Standing Committee on Administration of Justice", Perspectives, Fall 1996, pp. 8-10.

Albert et al., "GIS/GPS in Law Enforcement Master Bibliography", Nov. 2000.

M. Anderson (Editor), "GPS Used to Track Criminals", GIS World, Aug. 1996, p. 15.

B. Clede, "Radio Computers Locate Places, and Plot Them on a Map, Too", Law and Order, Oct. 1994, <http://www.clede.com/Articles/Police/gps.htm>.

G.W. Brown Jr., "What Impact Will Personal Position Location Technology Have Upon the Management and Administration of Mid-Sized Law Enforcement Organizations by the Year 2000?", California Commission of Peace Officer Standards and Training, Sacramento, California, Jul. 1994.

D. Anderson et al., "Seattle and Tacoma PDs Automated Crime Analysis", The Journal, National FOP Journal, Spring 1990.

B. Wise, "Catching Crooks with Computers", American City and Country, May 1995, pp. 54-62.

M. Alexander et al., "An Automated System for the Identification and Prioritization of Rape Suspects", SDSS for Rape Suspect Identification, http://www.esri.com/library/userconf/proc97/proc97/to350/pap333.htm, Jul. 2001.

L. Pilant, "Spotlight on . . . High-Technology Solutions", From Police Chief, Document #54650, May 1996.

M. Lyew, "A New Weapon for Fighting Crime", American Probation and Parole Association, "Electronic Monitoring", 1996, <http://www.appa-net.org/about%20appa/electron.htm.

Hoshen, J.; Sennott, J.; Winkler, M. "Keeping tabs on criminals [electronic monitoring]" Spectrum, IEEE, vol. 32, Issue 2, Feb. 1995, pp. 26-32.

National Center for Juvenile Justice. (1991). Desktop guide to good juvenile probation practice, Pittsburgh, PA: Author.

Davis, S. (1986). Evaluation of the First Year of Expanded House Arrest, Oct. 1, 1984-Sep. 30, 1985: Oklahoma Department of Corrections.

Jones, R K., Wiliszowski, C. H., & Lacey, J. H. (1996). Evaluation of Alternative Programs for Repeat DWI Offenders (Report prepared by Mid-America Research Institute No. DOT HS 808 493). Washington, D.C.: National Highway Traffic Safety Administration Office of Program Development and Evaluation.

Nieto, M. (1996). Community correction Punishments: An Alternative to Incarceration for Nonviolent Offenders, Sacramento, California Research Bureau.

Reconnecting Youth & Community: A Youth Development Approach. (1996). Washington, DC: Family and Youth Services Bureau, Administration on Children, Youth and Families, U.S. Department of Health and Human Services.

Whitfield, D. Tackling the Tag: The Electronic Monitoring of Offenders. Winchester, U.K.: Waterside Press, 1997. (Books).

Torbet, P. M. (1997). Automated information systems in juvenile probation. In D. W. Thomas & P. M. Torbet (Eds.), Juvenile probation administrator's desktop guide (pp. 81-89). Pittsburgh, PA: National Center for Juvenile Justice.

Spaans, E. C., & Verwers, C. (1997), Electronic monitoring in the Netherlands: results of the experiment. The Hague, Netherlands: Ministry of Justice.

Church, A., & Dunstan, S. (1997). Home Detention: the Evaluation of the Home Detention Pilot Program 1995-1997. Wellington, New Zealand: Ministry of Justice.

Canada. Solicitor General Canada. Annual Report on the Use of Electronic Surveillance as Required Under Subsection 195(1) of the Criminal Code. Ottawa: Solicitor General Canada, 1991-1994. (Book).

Schwitzgebel, R. L., & Bird, R. M. (1970). Sociotechnical design factors in remote instrumentation with humans in natural environments. Behavior Research Methods and Instrumentation, 2(3), 99-105.

Gould, L. A., & Archambault, W. G. (1995). Evaluation of a Computer-Assisted Monitoring (CAMO) Project: Some Measurement Issues. American Journal of Criminal Justice, 19(2), 255-273.

Gable, R. K. (1986). Application of personal telemonitoring to current problems in corrections. Journal of Criminal Justice, 14 (2), 167-176.

Mainprize, S. (1996). Elective Affinities in the Engineering of Social Control: The Evolution of Electronic Monitoring. Electronic Journal of Sociology, 2(2), 26.

Charles, Michael T. "The Development of a Juvenile Electronic Monitoring Program." Federal Probation, vol. 53 (1989), 3-12.

Huskey, B. L. (1987). Electronic Monitoring: an Evolving Alternative, Perspectives, 11(3), 19-23.

Office Action dated May 13, 2009 cited in U.S. Appl. No. 12/028,088.
Office Action dated Jun. 9, 2008 cited in U.S. Appl. No. 11/486,992.
Office Action dated Jan. 22, 2009 cited in U.S. Appl. No. 11/486,992.
Office Action dated Feb. 4, 2008 cited in U.S. Appl. No. 11/486,989.
Office Action dated Jul. 29, 2008 cited in U.S. Appl. No. 11/486,989.
Office Action dated Jan. 26, 2009 cited in U.S. Appl. No. 11/486,989.
Office Action dated May 22, 2008 cited in U.S. Appl. No. 11/486,976.
Office Action dated Oct. 2, 2008 cited in U.S. Appl. No. 11/486,976.
Office Action dated Jan. 28, 2009 cited in U.S. Appl. No. 11/486,976.
Office Action dated Jul. 20, 2009 cited in U.S. Appl. No. 11/486,976.
Office Action dated Dec. 12, 2007 cited in U.S. Appl. No. 11/486,991.
Office Action dated Jul. 7, 2008 cited in U.S. Appl. No. 11/486,991.
Notice of Allowance dated Feb. 27, 2009 cited in U.S. Appl. No. 11/486,991.
Office Action dated Dec. 11, 2008 cited in U.S. Appl. No. 11/830,398.
Office Action dated Aug. 19, 2009 cited in U.S. Appl. No. 11/830,398.
Notice of Allowance dated Sep. 18, 2009 cited in U.S. Appl. No. 11/486,992.
Notice of Allowance dated Dec. 29, 2009 cited in U.S. Appl. No. 11/486,992.
Office Action date Dec. 21, 2009 cited in U.S. Appl. No. 11/486,976.
Office Action dated Jan. 11, 2010 cited in U.S. Appl. No. 12/028,088.
U.S. Appl. No. 12/818,453, filed Jun. 18, 2010, Roper.
U.S. Appl. No. 12/028,088, filed Apr. 16, 2010, Notice of Allowance.
U.S. Appl. No. 12/875,988, filed Sep. 3, 2010, Derrick.
U.S. Appl. No. 11/486,989, filed Jul. 28, 2010, Office Action.
U.S. Appl. No. 12/792,572, filed Oct. 6, 2010, Office Action.
U.S. Appl. No. 11/486,976, filed Oct. 28, 2010, Notice of Allowance.
U.S. Appl. No. 12/875,988, filed Nov. 16, 2010, Office Action.
U.S. Appl. No. 11/486,989, filed Feb. 23, 2010, Office Action.
U.S. Appl. No. 11/486,989, filed Dec. 21, 2010, Office Action.
U.S. Appl. No. 11/486,989, filed May 24, 2011, Office Action.
U.S. Appl. No. 11/486,976, filed Jan. 6, 2011, Notice of Allowance.
U.S. Appl. No. 12/792,572, filed Mar. 3, 2011, Notice of Allowance.
U.S. Appl. No. 12/875,988, filed Jun. 10, 2011, Notice of Allowance.
U.S. Appl. No. 12/792,572, filed Jun. 2, 2010, Derrick.
International Search Report and Written Opinion issued for PCT Application PCT/US2007/072743; dated Jan. 28, 2008; 9 pages.
International Search Report and WRitten Opinion issued for PCT/US2007/072740; dated Apr. 11, 2008; 8 pages.
International Search Report and WRitten Opinion issued for PCT Application PCT/US2007/072746; dated Jul. 2, 2008; 10 pages.
U.S. Appl. No. 11/486,989, filed Dec. 13, 2011, Office Action.

* cited by examiner

SYSTEM AND METHOD FOR MONITORING INDIVIDUALS USING A BEACON AND INTELLIGENT REMOTE TRACKING DEVICE

TECHNICAL FIELD

The field of the present invention relates to remote tracking and communication systems and devices, and more particularly to beacons for use in remote tracking systems to provide a fixed point of reference for a remote tracking device.

BACKGROUND OF THE INVENTION

Systems for tracking persons, especially criminal offenders, parolees, subjects of restraining orders, and the like, have typically used two types of mechanisms for establishing the location of the person of interest. The first is a typical home arrest, house arrest, system as described by U.S. Pat. No. 5,523,740 issued Jun. 4, 1996 to Burgmann. This system uses a base station at a fixed location and connected to a phone line. The person of interest wears a portable transmitter or beacon that periodically transmits a radio frequency signal or ping. If the beacon is in range of the base station the base station detects this ping and records that the subject is at the location being monitored by the base station at that time. The base station can be programmed with rules requiring that the transmitter, and by implication the person of interest, be within range of the base station at particular times. If the base station is programmed to expect the person of interest to be within range, but does not detect the ping from the transmitter, the base station can then call the monitoring authority to report the violation of the rules.

A variation on this first system retains the beacon affixed to the person of interest, but allows for a mobile transmitter that has location detection circuitry, such as is described by U.S. Pat. No. 6,072,396 issued Jun. 6, 2000 to Gaukel. In both the cases described above, a beacon is fixed to the person of interest and the beacon sends out an intermittent signal which is detected by a base station. The base station may manage rules determining when the beacon is to be in range of the base station and report any violations to a monitoring authority.

In the second type of monitoring system, the person of interest is monitored at all times using an intelligent remote tracking device and the entire device used in the monitoring is securely attached to the person of interest. Examples of these types of systems are disclosed in United States Patent Application Nos. 2008/0018458, 2008/0018459, 2008/0012761 and 2008/0012760, the disclosures of which are hereby incorporated by reference. In this case there is no beacon required, as the device is regularly or continually monitoring for tampering and location and reports the location and status of the device to a monitoring center or monitoring authority. This second type of system is illustrated in FIG. 1, which shows the major elements of a remote tracking system. System 100 is used to track multiple intelligent remote tracing devices (RTDs). Each RTD 101 includes a positioning system engine, such as a global positioning system (GPS) engine, which is able to receive signals from one or more sources, either terrestrial networks or satellite network such as multiple GPS satellites 102, and to perform a location calculation based on the signals from the sources.

In addition to a GPS engine, the RTD includes a wireless/cellular transceiver. After a location determination has been made by the GPS engine or an internal microprocessor, the location information and information indicating the status of the RTD is sent over a terrestrial network, which is preferably a cellular network, as shown by cellular network 103, but can be any other type of communications network, including two way radio, satellite or other network. In order to be useful, each position location for the RTD needs to include an indication of the time for the location. In a preferred embodiment, the RTD uses the time information contained in the GPS signals themselves to provide the time indication for the position determination; however, instead of using the time information from the GPS signal, the RTD itself may provide the time indication from an internal clock. An internal clock may also be used to provide time indications on when data packets were created and sent using the cellular connection.

The information sent by the RTD over its cellular connection is received by monitoring center 104. Monitoring center 104 is preferably a staffed monitoring center providing representatives who can act as an intermediary between the person being monitored and the parole officer, supervisor or administrator with responsibility for the person being monitored. The monitoring center also includes the computer resources required to process, store and analyze the data received from the RTDs and provide the interface for the officers/supervisors/administrators to review the information in the system and to setup, modify and terminate the operating parameters for each individual RTD. Access to the information in the monitoring center is available through a web interface which connects to a network 105, such as the Internet, which allows persons with authorization 106 outside the monitoring center to access information in the monitoring centers computers.

While the second, wholly contained monitoring device and system, is more flexible and offers advantages over the first system and its reliance on base stations, the second type tracking device and system could benefit from fixed points of reference independent of the internal location detection mechanisms.

BRIEF SUMMARY OF THE INVENTION

The present invention is directed to a system and method that uses a fixed or mobile beacon with an intelligent RTD to provide monitoring for an individual at predefined fixed locations such as a home, office, half-way house, or other similar site. Embodiments of the system includes a fixed beacon at a known location, the fixed beacon periodically emitting a signal indicating the identity of the beacon, a remote tracking device securely affixed to the individual, the remote tracking device including a short range transceiver, a long range transceiver, and a rule set establishing operating parameters for the remote tracking device, wherein the short range transceiver is operable to receive the signal from the beacon and to use the signal to determine compliance with one or more rules in the rule set, and a monitoring center monitoring the status of the remote tracking device using data sent by the remote tracking device using the long range transceiver.

Embodiments of the beacon include a transmitter for transmitting a short range signal, a movement detector operable to indicate when the beacon has been moved, an internal power supply for the beacon, and a processor connected to the transmitter and movement detector, the processor operable to maintain a log of the movement of the beacon and to cause the transmitter to periodically transmit the signal, wherein the signal includes a identification number for the beacon, a status for the internal power supply; and information related to the movement log.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

In accordance with the concepts described herein, a system and method are described that use a fixed beacon with an intelligent RTD to provide monitoring for an individual at predefined fixed locations such as a home, office, half-way house, or other similar site. Using a fixed beacon with an intelligent RTD allows for the increased functionality of the intelligent RTD, but also provides for fixed points of reference that enhance the accuracy of the RTD and allow the RTD to conserve battery power and reduce the frequency of location/status transmissions when in range of a known beacon.

Figure 1:
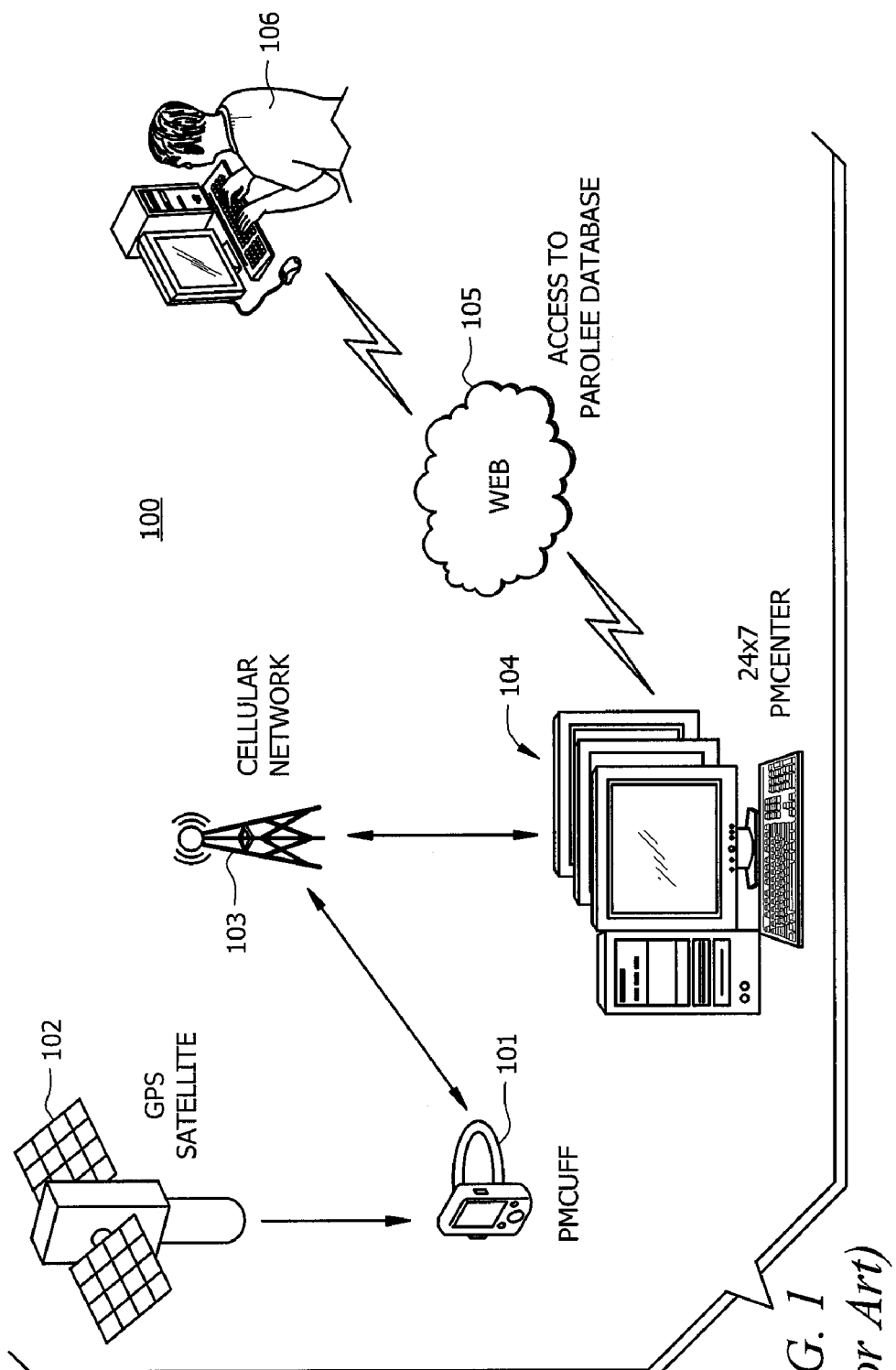
FIG. 1 is a diagram of a prior art remote tracking system and device.
Figure 2:
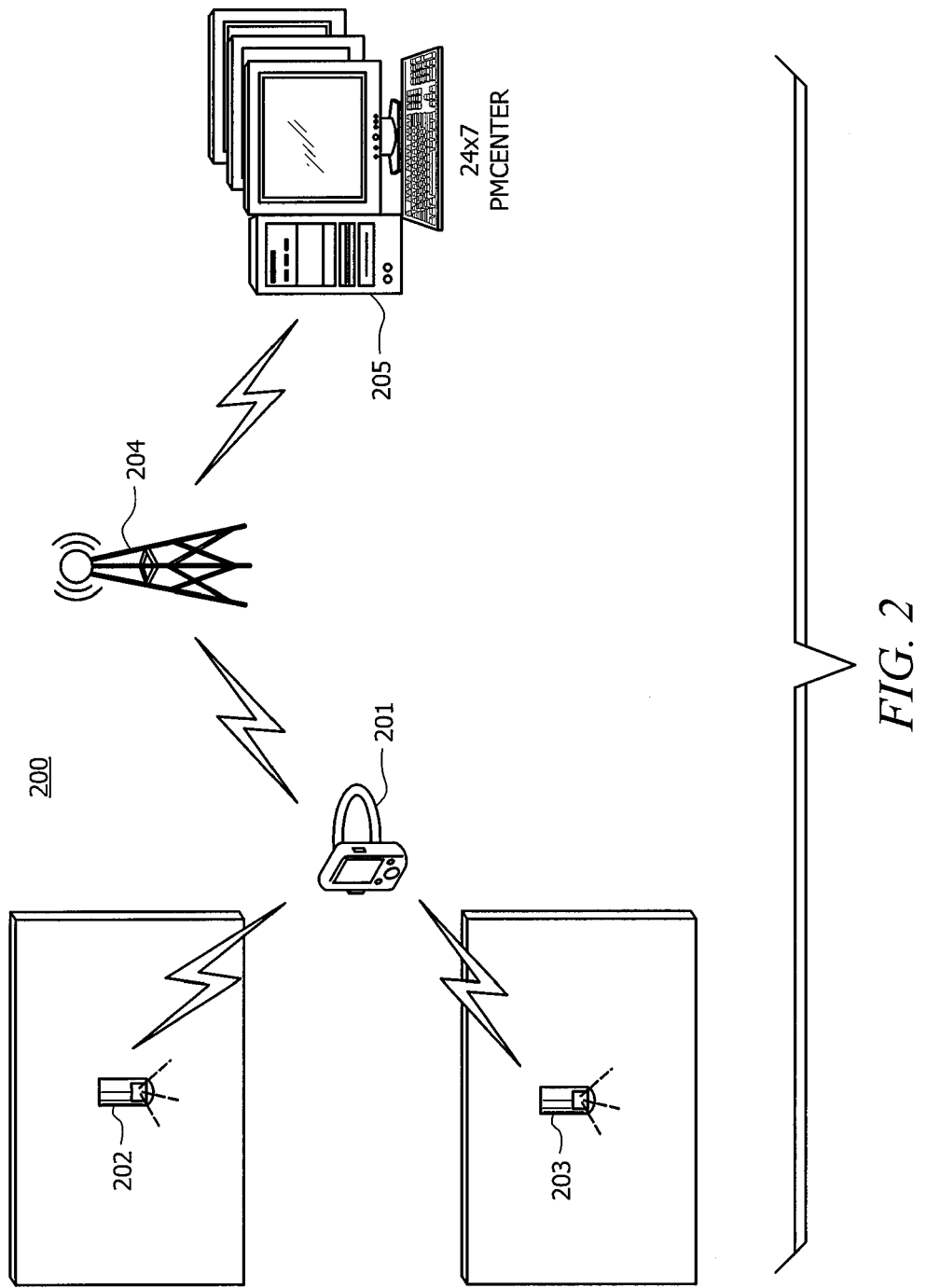
FIG. 2 is a diagram of an embodiment of a fixed beacon/intelligent tracking device system according to the concepts described herein.

Referring now to FIG. 2, an embodiment of a fixed beacon monitoring system is illustrated. System 200 includes an intelligent RTD 201. As described in FIG. 1, and will be described in more detail with reference to FIGS. 3 and 6, RTD 201 includes a microprocessor, a position system engine, a long range wireless transceiver, such as a cellular transceiver, a short range radio frequency (RF) transceiver, and a microprocessor. The RTD uses its RF transceiver to listen for "pings" from any beacon in range, such as beacons 202 and 203. In the system of FIG. 2, beacons 202 and 203 are set at fixed locations by mounting them to a fixed surface such as a wall. Beacons 202 and 203 include motion detection circuitry that allow the beacons to determine if it has been moved from its fixed location.

Each beacon sends out an RF signal on a regular interval, such as, for example, every 30 seconds. This signal preferably contains an identification number (ID) identifying the beacon and can also contain other information about the beacon and its status as will be discussed below. The RTD 201 is programmed with rules concerning beacons that are of interest to the RTD. When an RTD detects a beacon signal it compares the beacon ID to its programmed rules. If that beacon ID does not have a rule entry, it is ignored. If there is a rule entry for that beacon ID the RTD can check the signal strength to determine the proximity to the beacon and can also determine if the RTD is in compliance with the rules associated with the beacon. For example. The RTD may be programmed with a rule requiring that it is within 100 feet of a particular beacon each day from 7 pm to 7 am. This would be a typical house arrest type rule where the beacon is located in the individual's home. At 7 pm the RTD would make sure that it is in range of the beacon by checking if it has received a ping from the beacon, comparing the beacon ID with the expected beacon ID, comparing the signal strength of the beacon signal with the signal strength expected at a range of 100 feet or less, and checking for any tamper signals, such as movement signals, from the beacon indicated that it had been tampered with.

While the simplest embodiment of a fixed beacon/RTD system includes a single beacon and single RTD, any number of beacons, RTDs and associated rules can be used in combination while being well within the scope of the concepts described herein. For example, while a fixed location may be able to be defined with the use of a single beacon, the location may be too large or may include multiple levels that cannot be accommodated by a single beacon. In that instance multiple beacons may be used to define the permitted area and may all be included in the same rule in the RTD. In that instance, as long as the RTD is receiving the proper ping from at least one of the beacons, the RTD determines that it is in compliance with the rule. Similarly, multiple RTDs can be programmed to respond to the same beacon or set of beacons, such as in a group house or place of employment where multiple persons of interest may be located. Although any one beacon may be used by multiple RTDs, each RTD is programmed with its own specific rules, such as the rules associated with that beacon location. Also, multiple beacons can be used to define areas shared by multiple RTDs, such as in a half-way house. While certain examples have been discussed, any combination of beacons, RTDs and associated rules are well within the scope of the concepts described herein.

In addition to detecting proximity to a fixed beacon for the purposes of determining if an RTD is within a required or permitted location, the RTD can be programmed with rules that use beacons to define prohibited locations. In that instance if the RTD detects a ping from a beacon defining a prohibited area, the RTD would report the rule violation as discussed with reference to FIG. 1. As discussed with FIG. 1, in addition to communicating with the beacon, the RTD can receive signals from positioning systems, such as GPS satellites, and with long range communication systems 204 such as cellular networks or two-way radio networks. The RTD uses the cellular network to communicate with a monitoring center 205 which monitors the status and compliance of the RTD and which can automatically, or using a live agent, take action or communicate with the RTD, a supervising authority, or emergency response systems, such as the police.

One of the advantages of using a fixed beacon with the intelligent RTD is that when the RTD is in the proximity of the beacon and in compliance with any associated rules, the RTD may turn off or decrease usage of subsystems such as its positioning system, and cellular system to conserve resources, or the RTD may enter itself or the subsystems into power conservation modes, such as sleep modes or reduced clock rate modes as are well known in the art. For instance by not using, or using much less frequently, certain subsystems in the presence of the beacon, the RTD may conserve battery power allowing longer spans between charges or battery changes. Further, the RTD when in proximity to a beacon can adjust its reporting frequency so that, for example, it reports status to the monitoring center every 30 minutes instead of every minute. Less frequent reporting saves charges for the use of the cellular airtime or cellular data service.

Non-compliance with the programmed rules in the RTD can occur immediately or can occur after a predetermined number of missed signals from the beacon. In certain embodiments the RTD must miss the expected beacon signal for a number of consecutive intervals. By allowing for occasional missed signals the system can be adapted to account for signals missed because of transmission nulls within the area covered by the beacon or as a result of transient conditions in the area.

Figure 3:
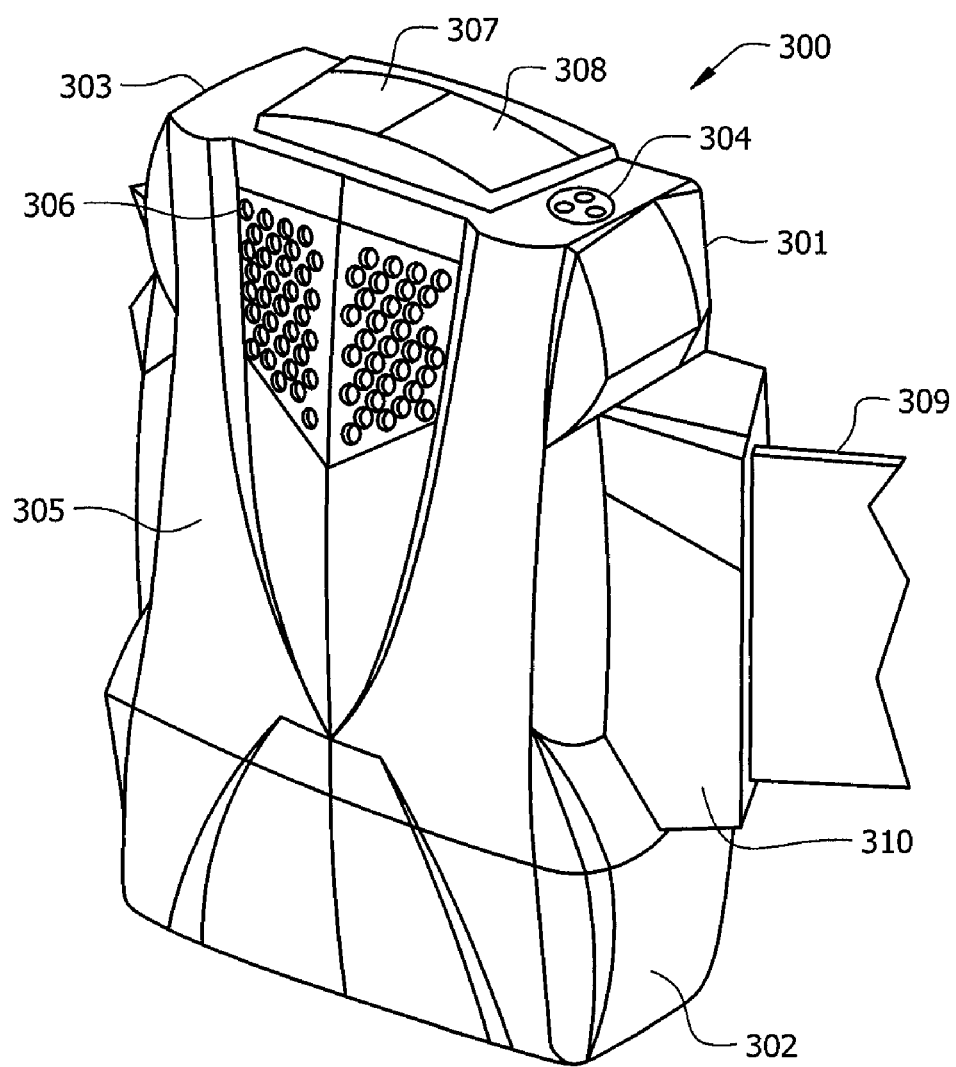
FIG. 3 is a perspective view of a remote tracking and communication device according to the concepts described herein.

Referring now to FIG. 3, an example of a physical embodiment of an intelligent RTD is shown. Device 300 can include a housing 301 with battery 302 either permanently attached or removably affixed thereto. The single housing is configured to contain all electrical components necessary for tracking and communicating with the individual wearing device 300. Battery 302 provides power to the electronic circuitry within housing 301, as described below, and is preferably rechargeable. Top side 303 of housing 301 includes a first set of through ports 304. Another side 305 of housing 301 includes a second set of through ports 306. The first set of through ports 304 are configured to allow sound to pass through to a microphone (not shown) disposed within housing 301, while the second set of through ports 306 are configured to allow sound to pass outward from a speaker (not shown) which is also disposed within the housing 301. Top side 303 of housing 301 also includes two panels 307 and 308, at least one of which is configured as a button to activate one or more of the electronic components described below.

The rear face of device 300 includes an appropriate curvature so that it can be attached to a person's body, preferably to an ankle. Battery 302, which is inserted into the bottom side of device 300, includes a release lever (not shown) which is movable to release the battery from the housing. Each end of a strap 309 (partially shown) is secured within an extension on each side of housing 301, such as extension 610. Strap 309 and the strap connections to housing 301 are tamper resistant and include security measures intended to prevent the disconnection or severing of strap 309, or if strap 309 is severed, device 300 can provide a signal indicating the status of the strap. The strap preferably includes one or more optical fibers and/or conductive materials embedded throughout its length, each of which is exposed at either end of the strap, or provides a continuous conductive loop and are connected to the electronics in device 300 which can determine the integrity of the connections or loop.

Additional tamper detection may be achieved through monitoring all externally accessible fasteners, e.g., the screws affixing the pressure block to the housing, the external battery, and the like, for electrical continuity by using each fastener to complete, or as part of, an electrical circuit.

Figure 4:
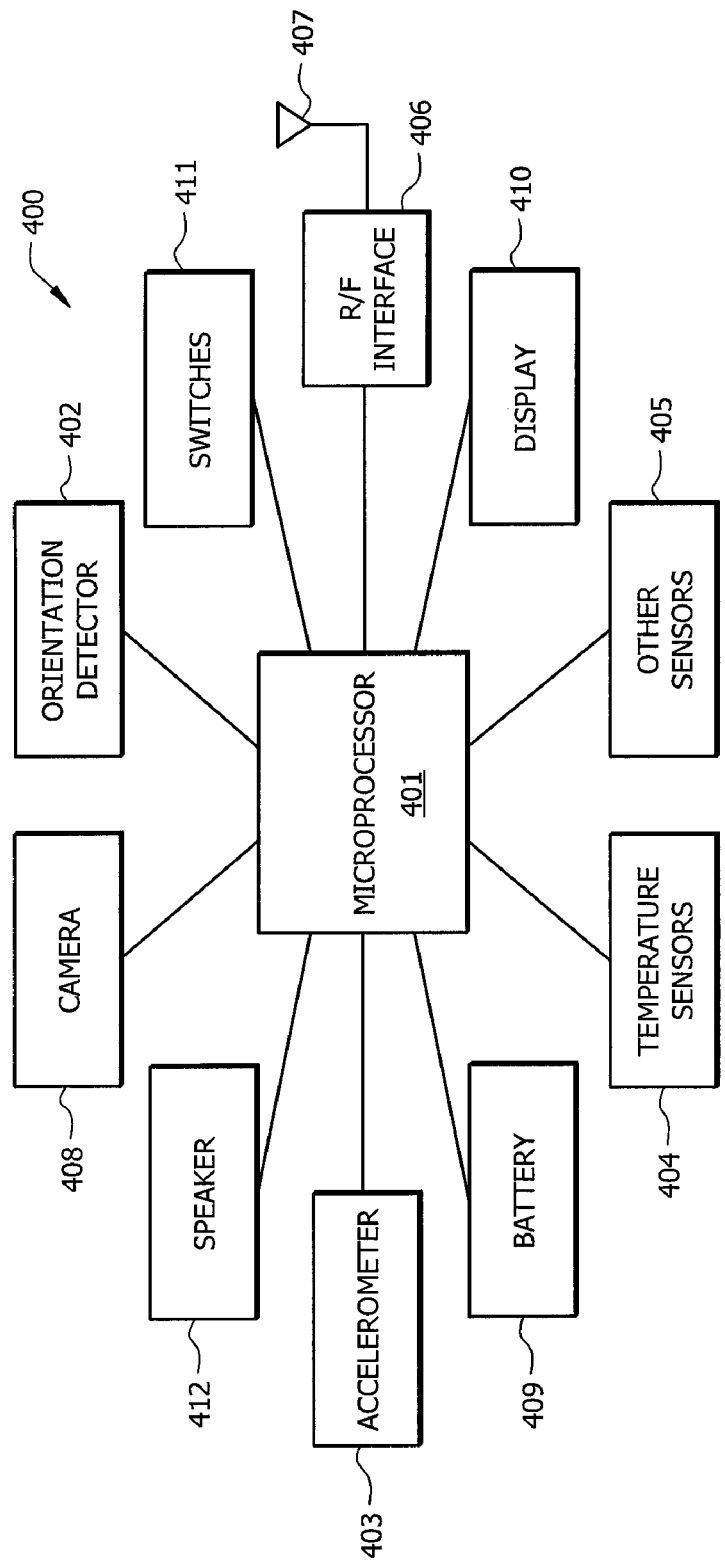
FIG. 4 is a diagram of an embodiment of the functional components of a beacon according to the concepts described herein.

Referring now to FIG. 4, a block diagram as an embodiment of the functional components of a beacon in accordance with the concepts described is shown. Beacon 400 includes a microprocessor 401 which is used to control the various aspects of the beacon. The microprocessor may have internal memory, external memory or both to hold the programming and store data for the beacon. Beacon 400 includes various sensors, but in a preferred embodiment includes an orientation detector 402 and accelerometer 403. Orientation detector 402 and accelerometer 403 can be used to detect tampering with beacon 400. In certain modes of operation, beacon 400 is affixed to a location using any number of methods including screws, nails, tape strips, etc. Once set in place the beacon is not intended to be moved, but instead provides a fixed location signal. Moving the beacon in this instance would be considered tampering. The accelerometer 403 measures movement of the beacon and the orientation detector detects any changes to the beacon's orientation along all three axes. The orientation detector and accelerometer can be used individually or in combination to allow the microprocessor to detect possible tampering or movement of the beacon. In preferred embodiments the microprocessor keeps a movement counter in memory and increments the movement counter when both the accelerometer 403 and orientation detector 402 have been triggered. The movement indicator, which may be a counter, is then sent as part of the data contained in ping transmissions from the beacon where it can be compared by an RTD to previous values of the movement count. If a change in the movement count is detected the RTD can alert a monitoring authority of the tampering with the beacon. While a particular embodiment has been described, other embodiments of tracking movement of the beacon are well within the scope of the concepts described herein.

In addition to the orientation detector and accelerometer, beacon 400 can also include other sensors and data collection elements such as a temperature sensor 404, a camera 409 which can take be either a still camera, video camera or combination, or any other sensors 405 that could be used to collect information of interest about the beacon's status or environment. Battery 409 provides power to the beacon and either the microprocessor or another voltage monitor monitors the state of battery 409. RF transceiver 406 and antenna 407 is used by beacon 400 to transmit the data signals or pings as described. While the beacon has been described as sending ping signals, the beacon can also be configured to receive signals using RF transceiver 406. Such received signals can be used by the beacon to change its programming, to provide data to the beacon or any other function that could improve the functionality of beacon 400. Display 410, which can be a LCD or similar display or one or more LEDs, can be included to provide status indication for the device such as periodically confirming the device is operational, can indicate low battery levels or the like, or can be used to warn a holder in system 700 described with respect to FIG. 7. A graphical or text display, or combinations of LEDs or flash patterns for one or more LEDs can also be used to provide more detailed information about the beacon as desired. Switches 411, which can be one or more button or switches, allow beacon 400 to be turned on or off or to be put in different operational modes.

Speaker 412 can be used to sound an alarm or to play prerecorded audio as determined by microprocessor 401 or in response to a signal initiating such an action by and RTD in range of the beacon.

In preferred embodiments, beacon 400 transmits the ping signal at a fixed signal strength regardless of the power supply, or battery voltage. By transmitting at a fixed signal strength at all times, RTDs are able to use the signal strength of the received signal to determine their proximity to the beacon using well known algorithms and methods.

In a preferred embodiment of beacon 400, switch 411 is used to provide power to the electronic components, while a button, or the orientation detector, or a combination of a button and the orientation detector is used to alternate the beacon between a test mode and an operational mode. In the preferred embodiment when the orientation detector indicates that a particular face of the beacon is in a horizontal position, the microprocessor places the beacon into a test mode that allows the operation of the beacon to be confirmed prior to placing it into an operational mode. The beacon is considered to be in the operational mode when the beacon is powered on and the particular face of the beacon is vertical. While two modes and specific method of alternating between the modes has been described with reference to a particular embodiment, any number of modes may be employed and any number of mechanisms may be used to alternate between the mode as would be understood by one skilled in the art.

In preferred embodiments, the operation of beacon 400 is kept as simple as possible so that the beacon can be installed by non-technical personnel such as parole officers or even the individuals themselves. The GPS system on the RTD can be used to verify installation at the correct location when installation is performed by the person being monitored. A land line connection can also be added to the beacon, or a separate base station could be added to the system with a land line, the base station, RTD and the beacon able to communicate using their respective wireless transceivers.

Beacon 400 can also be configured to have any number of radiation patterns using antenna 407 which may be a single antenna or an array of antennas. In preferred embodiments the radiation pattern of antenna 407 is 360° and may be spherical or a "squashed" sphere in which the radiation pattern is smaller along the vertical axis. Other radiation patterns may also be included in embodiments of beacon 400, such as a 180° radiation pattern or any other radiation pattern that would improve the operation of the monitoring system. Further, the ping signal itself can be any type of signal receivable by the RTD and can be analog or digital. The ping signal can also be encrypted or can use rolling code security as is well known. Each beacon may also include power conserving modes and may use these mode to conserve resources. For example, a beacon may "sleep" between pings to conserve battery power.

Figure 5:
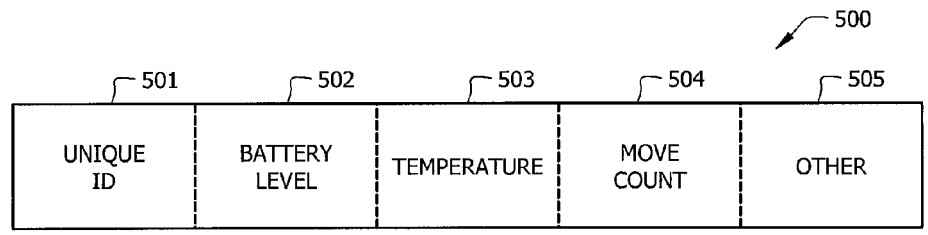
FIG. 5 is a diagram of an embodiment of a ping packet used with the embodiments of the monitoring system.

Referring now to FIG. 5, an embodiment of a "ping" signal sent by a beacon according the concepts described herein is shown. Ping signal 500 preferably includes a variety of information about the beacon sending the signal. First, each beacon must have an ID associated with it to allow RTDs to determine if the beacon is one of interest to that RTD. The ID, shown in field 501, is preferably, but not necessarily, unique and is used in the programming of rules in the RTDs. Other information relevant to the operation of the beacon and tracking system includes the beacon battery level, shown in field 502, which allow RTDs to report low battery status of each beacon to a monitoring authority. Temperature, field 503, move count, field 504, and any other relevant information, field 505, can also be included in the ping signal.

Figure 6:
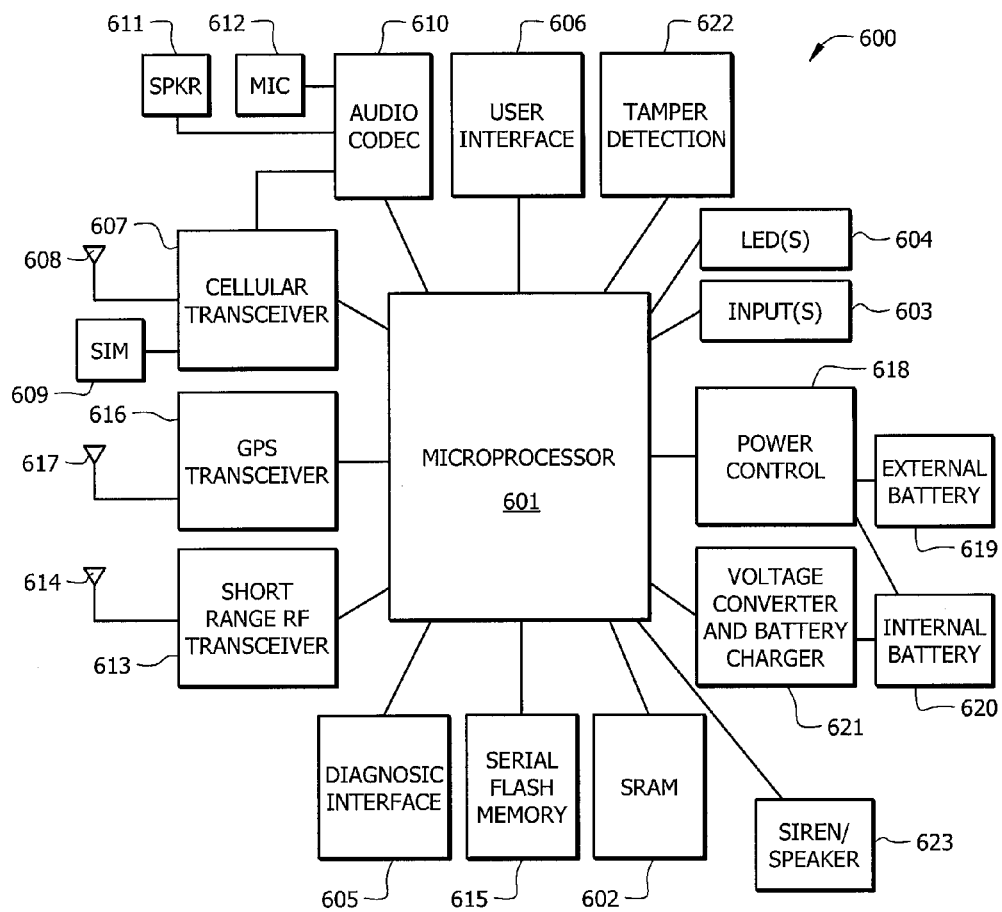
FIG. 6 is a diagram of an embodiment of the functional components of a remote tracking device according to the concepts described herein.

Referring now to FIG. 6, an embodiment of the electronic aspects of the remote tracking device is shown. As with the components described in FIG. 4, the type of connection between the various components is a matter of design choice, and may vary depending upon the specific component chosen to perform for a particular function. Further, where a specific component is indicated, those skilled in the art will appreciate that the indicated component may be substituted with other, functionally equivalent components that are readily available in the marketplace.

Electronics 600 includes microprocessor 601. Microprocessor 601 controls overall operation of the device according to programming stored in memory 602, which can be SRAM memory. Electronics 600 may include inputs 603, which can be inputs such as switches or buttons, are included as inputs to microprocessor 601 and can be used to input data or provide for activation of pre-designated functionality controlled by microprocessor 601. In embodiments of the RTD, there is one button dedicated for activation of voice communications with the monitoring center. LEDs 604 are used as function and status indicators. The programming stored in memory 602 may be placed there at the time of manufacture, and additional, new or modified programming may be uploaded to the device using a wired connection via the included diagnostic interface 605, user interface 606, or wirelessly via the cellular transceiver 607 received by antenna 608.

Cellular transceiver 607 may be of the GSM/GPRS variety, and may include a SIM card 609. Cellular transceiver 607 allows two-way voice and data communication between the remote device and the monitoring center 104 from FIG. 1. Voice communications are further enabled by a direct connection between cellular transceiver 607 and an audio codec 610, which encodes and decodes the digital audio signal portion of the wireless transmission, and an associated speaker 611 and microphone 612. While audio codec 610 is shown as a separate component, the codec may be contained or embedded in other components, such as processor 601, or any of the transceivers 607, 613. Data communications preferably use the cellular data channel and/or the cellular control channel, which can make use of short message service (SMS) capabilities in the network. This has additional benefits in that it provides redundancy for cellular systems in which service for both types of data communication is supported. Also, for those cellular systems in which the voice channel cannot be used simultaneously with the data channel, or in which the data channel is simply unavailable, the control channel can provide a data link between the call center and the device.

Electronics 600 may also include short range wireless transceiver 613 and associated antenna 614, which, if included, allow for short range wireless voice and data communications with peripheral devices. Wireless transceiver 613 may be designed and implemented using any of the alternative wireless communication standards which are well known in the art. Transceiver 613 is used in preferred embodiments to receive signals from fixed beacons as has been described. Further, transceiver 613 may be used to send short range signals to other devices including fixed beacons and mobile beacons or other RTDs as will be described below.

Microprocessor 601 can be programmed to pass through voice communications received by cellular transceiver 607 to a voice-capable peripheral when such a peripheral is employed in conjunction with the remote tracking and communication device and is activated. Voice communications received from a voice enabled peripheral can be passed through to cellular transceiver 607 for transmission. Data generated by the device or received from a peripheral, if any, may be stored by microprocessor 601 in memory 615, which can be non-volatile memory such as serial flash memory until required by microprocessor 601 or until it is to be transmitted by the device.

GPS receiver 616 and antenna 617 receive signals transmitted by GPS satellites, the signal used to establish the geographical location of the device and the person being monitored. In one embodiment, data from GPS receiver 616 is passed through to microprocessor 601, which in turn processes the data to determine a location and associated time, and stores it in the serial flash memory 615 pending transmission using cellular transceiver 607. While electronics 600 are shown with a GPS receiver which passes the GPS signal data to the microprocessor for processing, a GPS engine which includes both the GPS receiver and the capability to process the GPS signal to produce a location determination and associated time indication may also be used according to the concepts described herein. Using a stand alone GPS engine would free processing bandwidth in the microprocessor, thereby allowing the microprocessor to perform other additional functions.

Cellular transceiver 607 may also be used to geographically locate the device through well known methods of cell tower triangulation, or may be used to provide location information used in assisted GPS schemes. Geographical location using cellular transceiver 607 may be performed in addition to, in conjunction with, or as a substitute for the GPS receiver 616. Other known methods for geographically locating the device may also be employed.

Either of memories 602 and 615, or memory resident on the microprocessor, may be used individually, or may be used in any combination to store the operating program and parameters for the operation of the device, as will be discussed later, and may further be used to store prerecorded audio or prerecorded messages that can be played through speaker 611 as part of the monitoring and alarm management system. A siren/speaker 623 may also be included in the device and controlled by microprocessor 601. Siren 623 is also used as part of the alarm system and can be activated to provide a high decibel audible alarm. This alarm can both warn those in the vicinity that the person being monitored has entered an exclusion zone or left an inclusion zone, and can aid the police in the location of the person being monitored. The siren can be activated automatically by the microprocessor as part of the alarm management system or can be activated remotely by sending a signal to the microprocessor using cellular transceiver 607. Siren 623 can be a separate device or could be combined with the functionality of speaker 611. Tamper detection circuit 622 monitors the condition of strap 309 from FIG. 3 and any other tamper detection sensors that may be part of the housing.

In the embodiment shown in FIG. 6, power to the processor and other electronic components is provided though power controller 618 by external battery 619, or internal battery 620 when the external batter is disconnected or the voltage of the external battery falls below a threshold. External battery 619 is removable and is preferably rechargeable by a separate recharging unit. Also, the person being monitored will preferably have multiple external batteries so that a charged external battery can be immediately inserted when a discharged battery is removed. Internal battery 620 is preferably internal to the housing and not accessible by the person being monitored. The internal battery allows the device to continue to operate normally while the external battery is being replaced. As the internal battery is intended to supply power to the device only during the transitioning from a depleted external battery to a charged external battery, or to provide a short amount of time to acquire a charged battery, the internal battery does not need to have a large capacity. Internal battery 620 is charged using power from external battery 619 using voltage converter 621 and/or a battery charger which may be connected to the device through voltage converter 621.

Since the RTD is intended to be worn around the ankle of the person being monitored, the microphone and speaker used for two-way voice communication is a significant distance from the ears and mouth of the person being monitored. To compensate for this a peripheral device may be used in conjunction with the RTD to aid in the two-way voice communication. In one embodiment the peripheral device has the form factor of a watch and includes an internal speaker, an internal microphone, and an internal short range wireless transceiver. The microphone and speaker are positioned in the housing of the peripheral to better enable voice communications. The short range wireless transceiver is configured to use the same wireless communications standard as the RTD to enable wireless voice and data communications between the device and the peripheral. A button can be included which, when pressed, causes a command signal to be sent to the RTD. This command signal can be used to instruct the remote tracking and communication device to initiate two-way voice communications with the monitoring center. When the peripheral device is used for such voice communications, the peripheral device communicates wirelessly with the RTD using the respective short range wireless transceiver of each respective unit, and the RTD then uses the cellular transceiver to connect the voice communications with the monitoring center. The microphone and speaker in the RTD can be disabled by the microprocessor when a peripheral device, such as described, is in use.

Using electronics such as those described above, embodiments of a remote tracking devices according to the concepts described herein may be programmed with a variety of useful features. One such feature is the ability to track the geographical location the individual wearing the device. Most frequently, the GPS receiver is used to determine the location of the device (and thus the wearer) at the time indicated in the GPS signals received from GPS network satellites. When the GPS is unable to determine location, the cellular transceiver may be used to determine the location of the device using well-known cellular tower triangulation techniques. Once identified, the location of the device is passed to the microprocessor, which processes the data according to its programming and stores the data in the memory.

Figure 7:
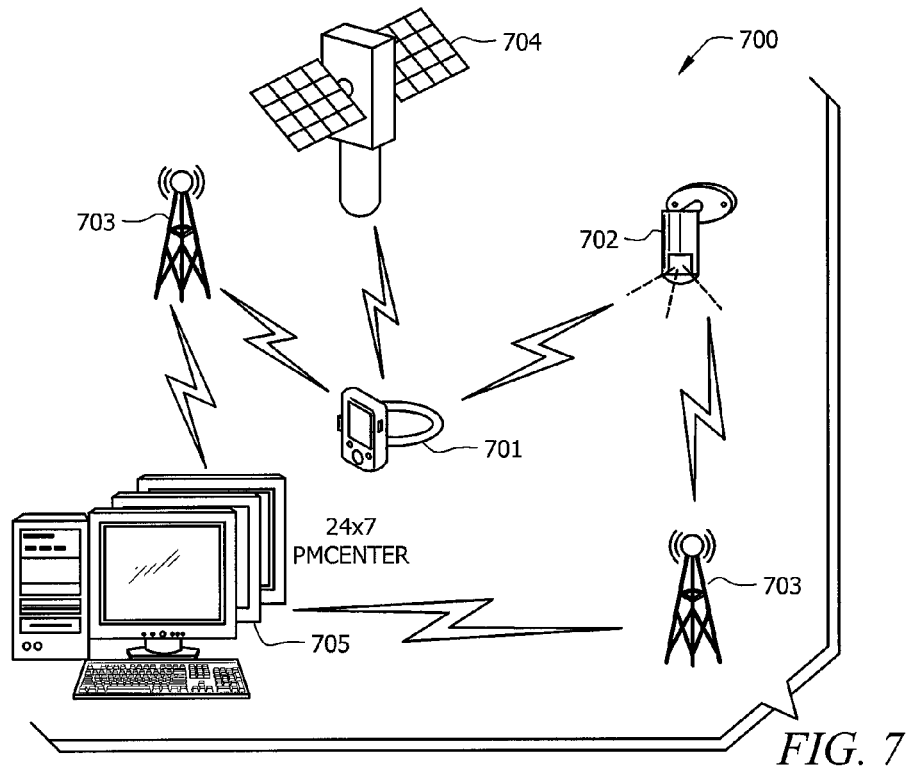
FIG. 7 is a diagram of an embodiment of a mobile beacon/intelligent tracking device system according to the concepts described herein.

Referring now to FIG. 7, an embodiment of a monitoring system using a mobile beacon and an RTD is described. In addition to using an intelligent RTD with a fixed beacon to enhance the performance of a monitoring system, intelligent RTDs could be used with mobile beacons to provide additional functionality and benefits. While the fixed beacon of FIG. 2 provides a fixed reference point for the RTD, a mobile beacon may be used as a reference point on a mobile area or person of interest. An illustrative embodiment of a application for a mobile beacon would be as warning mechanism for a person who has a restraining order against another person or who has a need to know if a particular person gets within a close proximity of their location.

System 700 operates much in the same manner as system 200 of FIG. 2, except that beacon 702 is not at a fixed location, but instead is under the control of a particular individual. Beacon 702 sends out a regular ping as is described with reference to FIGS. 4 and 5. RTD 701 listens to pings from beacons and compares the identity of those beacons with its programmed rule set. If beacon 702 is of interest to RTD 701, in this example the wearer of RTD 701 is prohibited from coming into a certain proximity to the holder of beacon 702, RTD 701 may taken any of several courses of action. In certain embodiments, RTD 701 can use its RF transmitter to announce its presence to beacon 702, thereby allowing beacon 702 to warn the holder of the presence of the wearer of RTD 701. In other embodiments, RTD 701 could use the cellular network 703 to send a message to the monitoring center 705 which can then alert beacon 702 to the presence of RTD 701. The location of RTD 701, obtained using GPS system 704, could also be sent by RTD 701 to the beacon or monitoring system as desired. Further, combination of these mechanisms could be used to warn the holder of beacon 702, and many different courses of action could be taken with regard to RTD 701. Such actions could include calling the police, playing prerecorded audio or messages in the form of voice or tones over the RTD to warn the wearer of the violation, establishing voice communications between the monitoring center and the RTD, or sounding the siren to alert those nearby to the presence of the wearer. Additional actions could be performed at the beacon, which could indicate a direction to travel to avoid contact, establish voice communications with the monitoring center or police, or other action as may be helpful to address the situation.

Other applications for a mobile beacon unit include drive by detection by parole or police officers. A person with a properly configured beacon can both verify the proximity of an RTD of interest and could also cause certain actions to be taken by the RTD, such as activating the siren or playing audio messages over the RTD. Such actions could be initiated by having predefined beacon IDs reserved in an RTD. When the RTD hears a ping from one of these reserved beacon IDs it would then respond to that beacon ID with a preset action.

Figure 8:
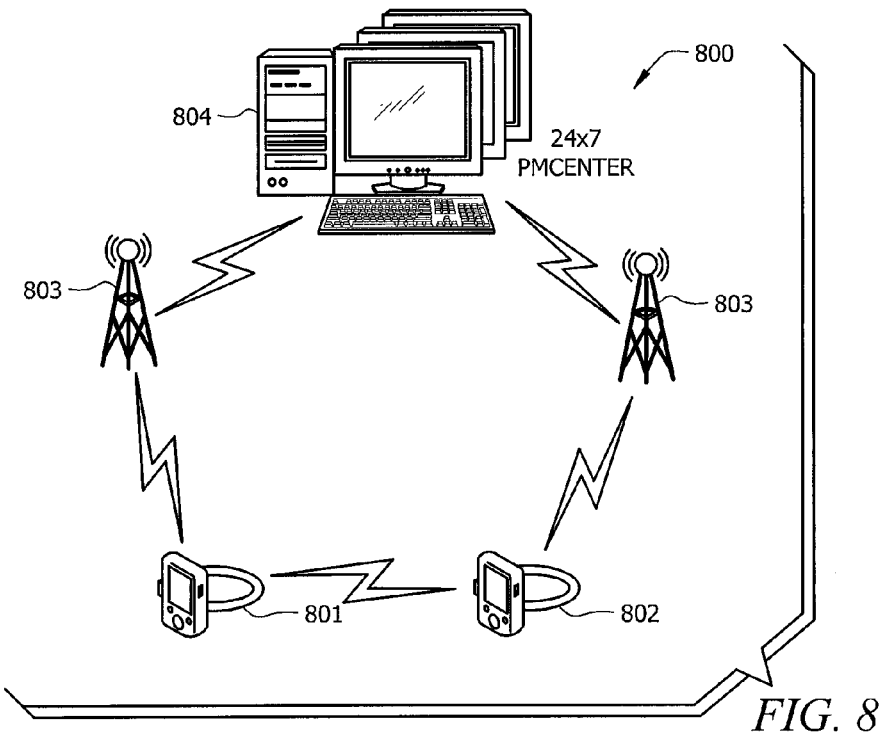
FIG. 8 is a diagram of an embodiment of a system for detecting the proximity of two or more intelligent tracking device system according to the concepts described herein.

Referring now to FIG. 8, a embodiment of a system for monitoring individuals wearing RTDs for proximity is shown. In addition to using beacons to provide pinging for proximity detection, the RF transceivers on RTDs can also be programmed to provide pinging functionality, thereby allowing each RTD to be used as a mobile beacon. System 800 uses two or more RTDs 801, 802 configured or configurable to send periodic pings. The RTDs communicate with a monitoring system 804 using a cellular network 803. Applications using this functionality could include monitoring gang members to determine if members of those gangs have contact with other gang members or if gang members are congregating. Pings received by other RTDs of interest can transmitted to the monitoring center and the location, and proximity of multiple RTDs can be recorded and monitored by the monitoring center.

Figure 9:
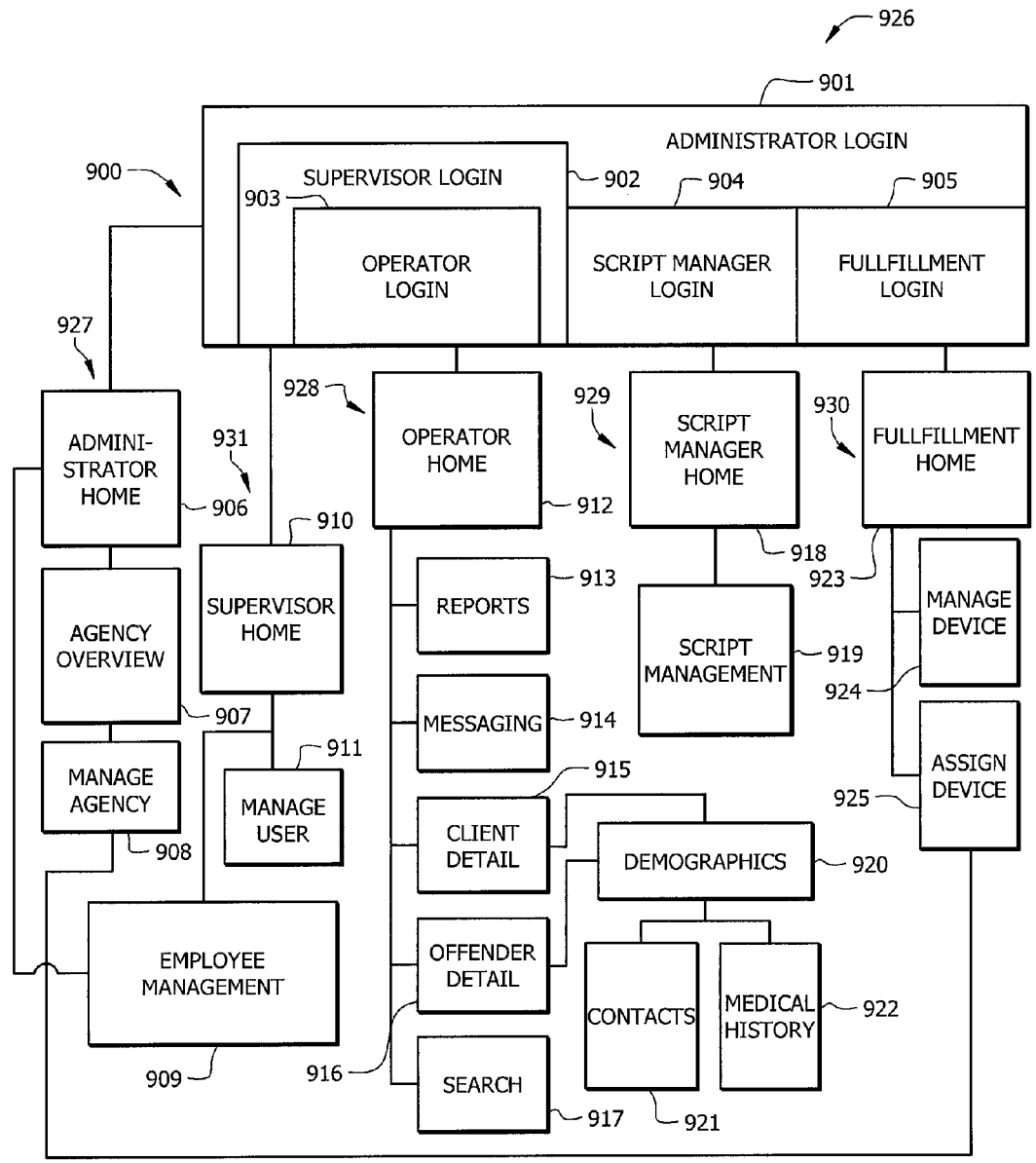
FIG. 9 is a diagram of an embodiment of the functional components of a monitoring center according to the concepts described herein.

Referring now to FIG. 9, an embodiment of a monitoring center application for use with the monitoring systems described herein is shown. Flow 900 begins with the login access 926. Administrator login 901 provides a user with administrator privileges access to the entirety of flow 900, including administrator flow 927, operator flow 928, script manager flow 929, fulfillment home 930, and supervisor flow 931. Lesser login privileges, such as supervisor login 902, operator login 903, script manager login 904 and fulfillment login 905 provide only access to their respective flows and any less included flows, such as the supervisor login providing access to supervisor flow 931 and operator flow 928.

Administrator flow, accessible by an authorized administrator, includes access to the administrator home 906 and to agency overview functions 907 and manage agency functions 908, as well as employee management functions 909. Supervisor privileges provide access to supervisor home 910, manage user functions 911, as well as to employee management functions 910. Supervisor privileges also provide access to operator flow 928 as does operator privileges. Operator flow 928 includes access to operator home 912 which includes access to reports functions 913, messaging functions 914, client and offender detail 915 and 916, respectively, and to search function 917. Client detail 915 and offender detail 916 provide further access to demographics functions 920 which contains access to contacts 921 and medical history 922.

Script manager privileges provide access to script manager home 918 and to script management functions 919. Fulfillment privileges provides access to fulfillment home 923 and device management functions 924 and device assignment functions 925.

A preferred embodiment of a call monitoring center in accordance with the concepts described herein includes a monitoring center which is staffed 24 hours, seven days a week. The monitoring center is responsible for monitoring all of the remote tracking devices in the field and is staffed based on historical patterns of requirements for intervention by monitoring center staff. The computers of the monitoring center automatically receive and process the location and status information continuously or periodically sent by each of the remote tracking devices. Based on programmable rules in the monitoring center software, the occurrence of certain conditions in the remote tracking devices results in the monitoring center software sending an alert to one of the monitoring center personnel. These conditions are usually related to alarm conditions in a remote tracking device, but can be programmed to be any condition which might be of interest to the monitoring center personnel or the supervisors or administrators of the person being monitored.

Events and conditions may be handled automatically by the monitoring center software or may be sent to live agents in the monitoring center for attention. When a condition is determined to require the attention of monitoring center personnel, the monitoring center software determines the appropriate monitoring center agent and sends the alert to the agent's terminal. The agent can then respond to the alert or access data in the monitoring center computers related to the history of the remote tracking device, the current parameters programmed into the remote tracking device, information on the wearer of the device or the agency or administrator in charge of the wearer and the device. If intervention, such as the initiation of a two-way voice call, is required by the agent, the monitoring center software provides a predetermined script for the agent to follow to ensure that the intervention by the agent conforms to the policies of the monitoring center and the agency or supervisor responsible for the tracking device and wearer.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A beacon for use in a monitoring system, the beacon comprising:
    a transmitter for transmitting a short range signal;
    a movement detector operable to indicate when the beacon has been moved;
    an internal power supply for the beacon; and
    a processor connected to the transmitter and movement detector, the processor operable to maintain a log of the movement of the beacon and to cause the transmitter to periodically transmit the signal, wherein the signal includes an identification number for the beacon, a status for the internal power supply; and information related to the movement log, and wherein
    the signal that is transmitted from the beacon is transmitted to a remote tracking device that includes a short range transceiver, a long range transceiver, and a rule set establishing operating parameters for the remote tracking device, wherein the short range transceiver is operable to receive the signal from the beacon and to use the signal from the beacon to determine compliance of the remote tracking device with one or more rules in the rule set stored by the remote tracking device.

2. The beacon of claim 1, further comprising:
    a camera operable to produce images that can be transmitted by the beacon using the transmitter.

3. The beacon of claim 1, further comprising:
    a receiver for receiving short range signals, the receiver operable to receive signals intended for the beacon.

4. The beacon of claim 3 wherein the signals intended for the beacon include one or more of the following: instructions for triggering an action by the beacon; instructions for reprogramming the beacon, audio for broadcast by the beacon; and messages for display by the beacon.

5. The beacon of claim 1, further comprising: a temperature sensor in communication with the processor.

6. The beacon of claim 1 wherein the beacon is operable to communicate with the remote tracking device using the transmitter.

7. The beacon of claim 6 wherein the remote tracking device is in communication with a monitoring center, the monitoring center operable to monitoring the status of the beacon using data passed from the beacon to the remote tracking device and from the remote tracking device to the monitoring center.

8. A system for monitoring an individual, the system comprising:
    a fixed beacon at a known location, the fixed beacon periodically emitting a signal indicating the identity of the beacon, the fixed beacon comprising a movement detector operable to indicate when the beacon has been moved;
    a remote tracking device securely affixed to the individual, the remote tracking device including a short range transceiver, a long range transceiver, and a rule set establishing operating parameters for the remote tracking device, wherein the short range transceiver is operable to receive the signal from the beacon and to use the signal to determine compliance with one or more rules in the rule set based at least in part on the signal emitted from the fixed beacon; and
    a monitoring center monitoring the status of the remote tracking device using data sent by the remote tracking device using the long range transceiver.

9. The system of claim 8 wherein the fixed beacon comprises:
    a transmitter for transmitting a short range signal;
    an internal power supply for the beacon; and
    a processor connected to the transmitter and movement detector.

10. The system of claim 9 wherein the fixed beacon is operable to maintain a log of the movement of the beacon and to cause the transmitter to periodically transmit the signal, wherein the signal includes a identification number for the fixed beacon, a status for the internal power supply; and information related to the movement log.

11. The system of claim 8 wherein the remote tracking device receives status data from the fixed beacon.

12. The system of claim 11 wherein the remote tracking device processes the status data and sends an alert to the monitoring center where the status data indicates a problem with the fixed beacon.

13. The system of claim 11 wherein the remote tracking device passes the status data from the fixed beacon directly to the monitoring center.

14. The system of claim 8 wherein the fixed beacon defines an area used by the remote tracking device to determine compliance with the rule set.

15. The system of claim 14 further comprising additional fixed beacons, wherein the set of fixed beacons defines an area used by the remote tracking device to determine compliance with the rule set.

16. The system of claim 8 further comprising additional fixed beacons, each fixed beacon defining an area, each area used by separate rules in the rule set used by the remote tracking device to determine compliance with the rule set.

17. A system for monitoring an individual, the system comprising:
    a beacon in the possession of a first individual, the beacon periodically emitting a signal indicating the identity of the beacon;
    a remote tracking device securely affixed to a second individual, the remote tracking device including a short range transceiver, a long range transceiver, and a rule set establishing operating parameters for the remote tracking device, wherein the short range transceiver is receives the signal from the beacon and uses the signal to determine if the remote tracking device is permitted within a specified distance of the beacon, based at least in part on the rule set stored at the remote tracking device, and wherein the remote tracking device is configured to can alert the beacon of the proximity of the remote tracking device to the beacon.

18. The system of claim 17 further comprising:
    a monitoring center monitoring the status of the remote tracking device using data sent by the remote tracking device using the long range transceiver.

19. The system of claim 17 wherein the remote tracking device receives status data from the beacon.

20. The system of claim 17 wherein the beacon is also operable to receive signals sent from the remote tracking device using the remote tracking device's short range transceiver, the signals including a unique id associated with the remote tracking device.

21. The system of claim 20 wherein the beacon is operable to alert the second individual of the presence of the remote tracking device.

* * * * *

UNITED STATES PATENT AND TRADEMARK OFFICE
CERTIFICATE OF CORRECTION

PATENT NO. : 8,232,876 B2  
APPLICATION NO. : 12/399151  
DATED : July 31, 2012  
INVENTOR(S) : Derrick et al.

Page 1 of 2

It is certified that error appears in the above-identified patent and that said Letters Patent is hereby corrected as shown below:

On the Title Page item (57), in the ABSTRACT  
Third line from the bottom, change "includes a identification" to --includes an identification--

In the Specification

Column 1  
Line 51, change "this case" to --these cases--  
Line 61, change "network such" to --networks, such--

Column 2  
Line 30, change "centers" to --center's--  
Line 44, change "includes" to --include--  
Line 63, change "a identification" to --an identification--

Column 4  
Line 13, change "beacons" to --beacon--  
Line 27, change "example. The" to --example, the--  
Line 37, change "indicated" to --indicating--

Column 5  
Line 60, change "610" to --310--

Column 6  
Line 44, change "409" to --408--  
Line 45, change "take be either a still camera, video camera" to --be either a still camera, video camera,--  
Line 66, change "button" to --buttons--

Signed and Sealed this  
Second Day of July, 2013

Teresa Stanek Rea  
*Acting Director of the United States Patent and Trademark Office*

CERTIFICATE OF CORRECTION (continued)
U.S. Pat. No. 8,232,876 B2

Column 7
Line 3, change "and" to --an--
Line 23, change "and specific" to --and a specific--
Line 24, change "has" to --have--
Line 27, change "mode" to --modes--
Line 51, change "mode" to --modes--
Line 55, change "according the" to --according to the--
Line 64, change "allow" to --allows--

Column 8
Line 43, change "is" to --are--

Column 10
Line 33, change "of a" to --of--
Line 36, change "location the" to --location of the--
Line 54, change "of a" to --of an--
Line 55, change "as" to --a--
Line 67, change "702," to --702, and--

Column 11
Line 1, change "taken" to --take--
Line 10, change "combination" to --combinations--
Line 32, change "a" to --an--
Line 52, change "privileges access" to --privileges and access--
Line 66, change "910" to --909--
Line 67, change "does" to --do--

In the Claims

Column 14
Line 10, change "a" to --an--
Line 42, change "transceiver is" to --transceiver--
Line 48, change "to can alert" to --to alert--.
Line 59, change "id" to --ID--